(12) United States Patent
Shannon et al.

(10) Patent No.: US 10,929,730 B2
(45) Date of Patent: Feb. 23, 2021

(54) RETROREFLECTIVE MULTISCALE CODES

(71) Applicant: 3M INNOVATIVE PROPERTIES COMPANY, St. Paul, MN (US)

(72) Inventors: Robert W. Shannon, Stillwater, MN (US); Glenn E. Casner, Woodbury, MN (US); Gautam Singh, Woodbury, MN (US); Guruprasad Somasundaram, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/335,370

(22) PCT Filed: Sep. 27, 2017

(86) PCT No.: PCT/US2017/053585
§ 371 (c)(1),
(2) Date: Mar. 21, 2019

(87) PCT Pub. No.: WO2018/064089
PCT Pub. Date: Apr. 5, 2018

(65) Prior Publication Data

US 2019/0220717 A1  Jul. 18, 2019

Related U.S. Application Data

(60) Provisional application No. 62/400,865, filed on Sep. 28, 2016, provisional application No. 62/400,874, (Continued)

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01); *G06K 7/1434* (2013.01); *G06K 19/0614* (2013.01); *G06K 19/06056* (2013.01)

(58) Field of Classification Search
CPC ......... G06K 19/00; G06K 19/04; G06K 19/06
(Continued)

(56) References Cited

U.S. PATENT DOCUMENTS

| 3,758,193 A | 9/1973 | Tung |
| 5,223,701 A | 6/1993 | Batterman |

(Continued)

FOREIGN PATENT DOCUMENTS

| EP | 0416742 | 3/1991 |
| WO | WO 2013-043827 | 3/2013 |

(Continued)

OTHER PUBLICATIONS

Clarke, "Reed-Solomon Error Correction", BBC Research &Developement White Paper WHP031, Jul. 2002, pp. 1-39.
(Continued)

*Primary Examiner* — Edwyn Labaze
(74) *Attorney, Agent, or Firm* — Sriram Srinivasan; X. Christina Huang

(57) ABSTRACT

In some examples, an article includes a substrate having a surface; a parent optical element set comprising one or more parent optical elements disposed on the surface of the substrate, a child optical element set comprising one or more child optical elements disposed on the surface of the substrate. Each of the parent optical elements has a first retroreflective property and each of the child optical elements has a second retroreflective property different from the first retroreflective property.

15 Claims, 7 Drawing Sheets

Related U.S. Application Data filed on Sep. 28, 2016, provisional application No. 62/400,879, filed on Sep. 28, 2016, provisional application No. 62/461,041, filed on Feb. 20, 2017, provisional application No. 62/485,426, filed on Apr. 14, 2017, provisional application No. 62/485,471, filed on Apr. 14, 2017, provisional application No. 62/485,449, filed on Apr. 14, 2017, provisional application No. 62/552,734, filed on Aug. 31, 2017.

(58) Field of Classification Search
USPC .................................. 235/494, 487, 375, 491
See application file for complete search history.

(56) References Cited

U.S. PATENT DOCUMENTS

| | | |
|---|---|---|
| 6,832,728 B2 | 12/2004 | Kennedy |
| 7,387,393 B2 | 6/2008 | Reich |
| 8,865,293 B2 | 10/2014 | Smithson |
| 10,417,541 B1* | 9/2019 | Mishra ................. G06K 7/1408 |
| 2010/0151213 A1 | 6/2010 | Smithson |
| 2016/0124431 A1 | 5/2016 | Kelso |
| 2018/0197052 A1* | 7/2018 | Yanson ............ G06K 19/06037 |
| 2018/0253616 A1* | 9/2018 | Johnson ............... G06K 9/3216 |

FOREIGN PATENT DOCUMENTS

| | | |
|---|---|---|
| WO | WO 2013-149142 | 10/2013 |
| WO | WO 2015-067725 | 5/2015 |
| WO | WO 2018-064198 | 4/2018 |
| WO | WO 2018-064203 | 4/2018 |
| WO | WO 2018-064212 | 4/2018 |

OTHER PUBLICATIONS

International Search Report for PCT International Application No. PCT/US2017/053585, dated Jan. 17, 2018, 5 pages.

* cited by examiner

RETROREFLECTIVE MULTISCALE CODES

CROSS REFERENCE TO RELATED APPLICATIONS

This application is a national stage filing under 35 U.S.C. 371 of PCT/US2017/053585 filed Sep. 27, 2017, which claims the benefit of U.S. Application No. 62/400,865, filed Sep. 28, 2016; U.S. Application No. 62/400,874, filed Sep. 28, 2016; U.S. Application No. 62/400,879, filed Sep. 28, 2016; U.S. Application No. 62/461,041, filed Feb. 20, 2017; U.S. Application No. 62/485,426, filed Apr. 14, 2017; U.S. Application No. 62/485,471, filed Apr. 14, 2017; U.S. Application No. 62/485,449, filed Apr. 14, 2017; U.S. Application No. 62/552,734, filed Aug. 31, 2017, the disclosure of which is incorporated by reference in its/their entirety herein.

TECHNICAL FIELD

The present disclosure relates to encoding information on a physical surface of an article and systems for encoding and decoding such information.

BACKGROUND

Barcodes are generally an optical machine-readable representation of data or information. Some barcodes represented data by systematically varying the widths and spacing's of parallel lines. These types of barcodes are commonly referred to as linear or one-dimensional (1D) barcodes. The data or information encoded in a barcode may relate to the object to which the barcode is attached.

Later, two-dimensional (2D) bar-codes were developed. These barcodes used geometric patterns in two-dimensions to encode data. A common type of 2D barcode is the quick response (QR) code, which is a matrix-type code in the shape of a square. A QR code often includes three distinctive squares at its corners that define the bounds and orientation of the code and a smaller square near the fourth corner that is used to normalize the image for size, orientation, and angle of viewing.

Information is encoded in a QR code using 8-bit codewords or blocks, where each bit is represented by either a white or black square. The bits are arranged in a basic matrix or grid pattern, where each bit is the same sized square. When the matrix is created, codewords follow two-pixel wide strips that zig-zag up and down from right to left in the code from the bottom right corner and navigating around other elements of the codes. In QR codes, the encoded information typically follows a standardized layout scheme to allow decoding devices to reliably retrieve the encoded information. The number of characters that can be encoded in a QR code is dependent on the size of each bit, the size of the QR code itself, the size of the alphabet of characters, and the level of error correction used. Generally, the higher the error correction level, the less the storage capacity. Even in view of existing technology related to bar codes, various shortcomings exist in barcodes, and signs or other articles containing such barcodes.

SUMMARY

Articles, techniques, and systems of this disclosure are directed to a machine-readable code comprising one or more values encoded in a hierarchy of optical element sets, wherein the machine-readable code is embodied on an article and is decodable by a computing device that receives an image of the code. The hierarchy of optical element sets may be structured in n levels of parent-level and child-level optical element sets, wherein optical elements of a child optical element set have a different retroreflective property from the retroreflective property of optical elements of the parent optical element set. In some instances, a first encoded value is based on the arrangement of a parent optical element set and a second encoded value is based on the same optical element position in the child and parent optical element sets, while the first encoded value and the second encoded value are different. In some cases, the parent optical element set is decodable from a greater distance between the article and image capture device than the child optical element set. In some cases, an optical element in the parent optical set may be used represent different information in different levels of the hierarchy of optical elements. In some cases, the parent optical element set is decodable using a lower intensity light source than the child optical element set. In this way, the hierarchical structure of the machine-readable code may allow more information to be encoded into the finite surface space of the article. As such, different information from different optical element sets in the hierarchical structure may be decoded from the machine readable code as the distance between the image capture device and article decreases.

At least some aspects of the present disclosure direct to an article comprising: a substrate having a surface; a parent optical element set comprising one or more parent optical elements disposed on the surface of the substrate, a child optical element set comprising one or more child optical elements disposed on the surface of the substrate, a first encoded value associated with at least one of the parent optical elements, and a second encoded value associated with at least one of the child optical elements, wherein each of the parent optical elements has a first retroreflective property, wherein each of the child optical elements has a second retroreflective property different from the first retroreflective property.

At least some aspects of the present disclosure direct to a method comprising: receiving, by a computing device a first image and a second image an article having a substrate that includes a surface, wherein the first image is captured at a first condition, wherein the second image is captured at a second condition different from the first condition, wherein a parent optical element set comprising one or more parent optical elements is disposed on the surface of the substrate, wherein a child optical element set comprising one or more child optical elements is disposed on the surface of the substrate, wherein each of the parent optical elements has a first retroreflective property, wherein each of the child optical elements has a second retroreflective property different from the first retroreflective property; decoding by the computing device, a first encoded value using the first image; and decoding by the computing device, a second encoded value using the second image.

At least some aspects of the present disclosure direct to a method comprising: receiving, by a computing device an image an article having a substrate that includes a surface, wherein a parent optical element set comprising one or more parent optical elements is disposed on the surface of the substrate, wherein a child optical element set comprising one or more child optical elements is disposed on the surface of the substrate, wherein each of the parent optical elements has a first retroreflective property, wherein each of the child optical elements has a second retroreflective property different from the first retroreflective property; decoding by the computing device, a first encoded value using the image of the article with a first processing method; and decoding by the computing device, a second encoded value using the image of the article with a second processing method different from the first processing method.

DETAILED DESCRIPTION

Figure 1:
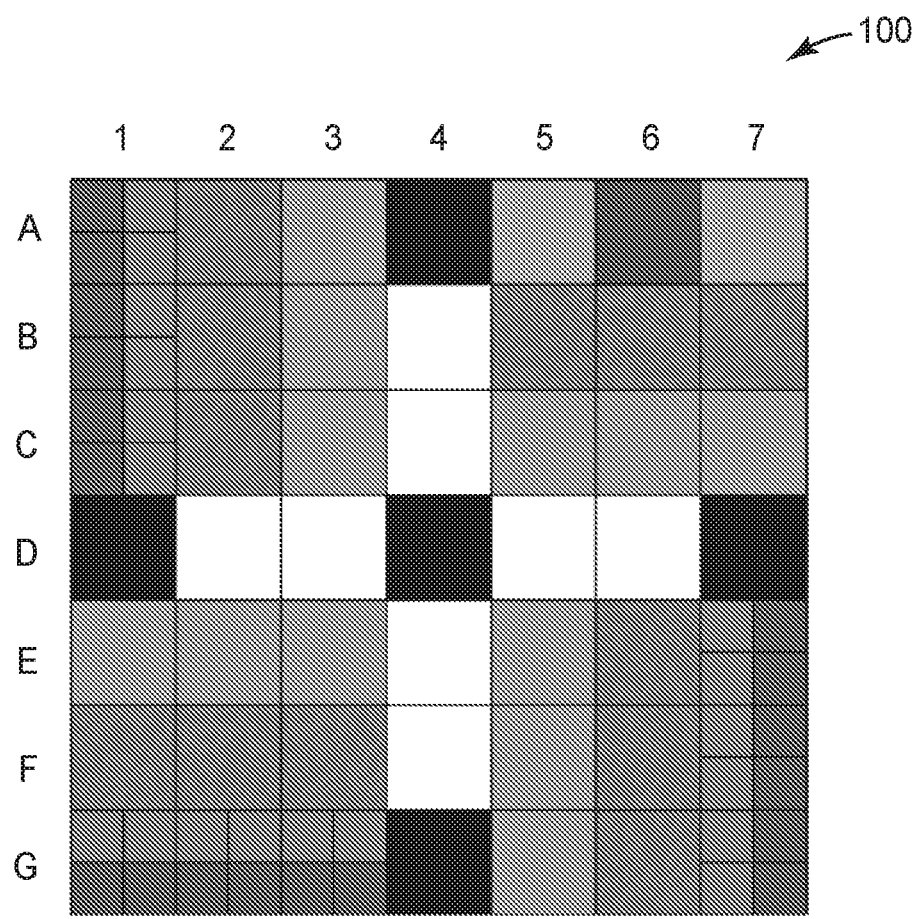
FIG. 1 is a machine-readable optical code with exemplary content and context optical elements.

FIG. 1 illustrates a machine-readable optical code 100 (or "code 100") with exemplary content and context optical elements. In some examples of this disclosure, machine-readable code 100 includes optical elements that represent binary or n-ary information and which may not be readable and/or contain information meaningful to a human. For instance, n-ary information may be represented using a base-n character or number system. In FIG. 1, code 100 is a multi-dimensional data matrix made up of squares or optical elements oriented in a configuration comprising rows and columns. In some examples, the terms "optical elements" and "modules" may be used interchangeable. Machine-readable optical codes of this disclosure are not QR codes, and may provide one or more advantages over QR codes as will be evident from this disclosure. Although articles, systems and techniques of the disclosure are described with respect to traffic signs, other articles may include a license plate, a garment, a wearable, a vehicle, an infrastructure, a decal, or the like.

As shown in FIG. 1, code 100 may represent a binary code in that some optical elements represent a bits of data, and is either white or black, with the colors white and black corresponding to "0" and "1", respectively, to encode machine-readable information in the code. Any possible encoding scheme, such as binary in the foregoing example, may be used. More generally, an optical element may, based on its visual appearance (e.g., grayscale value) or its retroreflective property, represent an encoded value in a set of encoded values, wherein the set of encoded values corresponds to a number of different, possible grayscale values that may be assigned to a particular optical element. Any number of different sets of encoded values may be used, such as alphabetic characters, numeric characters, or any other symbols. In some cases, the encoded values are differentiable based on visual differentiability and/or retroreflective property differentiability of the respective optical elements. For purposes of illustration, the squares shown in FIG. 1 include n-ary grayscales of shading to illustrate different encoded values in code 100 as n-any encoded elements. In some cases, the grayscales of shading represent different retroreflective properties. In one example, the retroreflective coefficient ($R_A$) of D4 is 50, $R_A$ of D3 is 500, $R_A$ of C3 is 100, and $R_A$ of C2 is 200.

In some instances, the different retroreflective properties are different retroreflective intensity values. In some instances, the different retroreflective properties are different wavelengths. In some instances, the different retroreflective properties have different polarization states. In some instances, the different retroreflective properties have different phase retardations. In some instances, the retroreflective properties are detectable in visible light spectrum. In some instances, the retroreflective properties are detectable in the infrared spectrum.

In some examples, wherein a set of encoded values includes N-number of encoded values. An optical element set may include M-number of optical elements, wherein an optical element set represents a combination of encoded values of a set of $N^M$ combinations of encoded values based at least in part on respective visual grayscale values assigned to respective optical elements of the optical element set. In some examples, the respective grayscale values are each included in a set of M-number of visually differentiable grayscale values. While the optical elements in FIG. 1 are shown as squares, optical elements consistent with the present disclosure may be of any shape.

In some examples, code 100 may include three types of optical elements: finder optical elements, context optical elements and content optical elements. Finder optical elements in FIG. 1 are the optical elements in row D and column 4 (a total of 13 optical elements). Specifically, optical elements A4, D1, D4, D7 and G4 are "0's" and the remainder of the finder optical elements are "1's". Finder optical elements may enable a machine vision system to recognize a 2D barcode in an image, or to localize an optical code within an image, including the outer edges of code 100.

Finder (i.e., parent) codes or optical elements enable a machine or machine vision system to sort through a variety of lines and other visual features that appear in an image in order to determine where an optical code spatially begins and ends. Finder codes or optical elements are typically fixed in position and sufficiently visually distinct or complex such that they would not normally occur in nature. Designing finder codes or optical elements in this way allows a machine vision to have reasonable certainty that it has identified a 2D code that it should decode. A more complex finder code increases the likelihood that the machine vision system will find and decode a 2D code. More visually complex finder codes may require an increase in the number of finder optical elements required to implement the code, and can result in smaller optical element size (which can increase the likelihood of optical element occlusion and misreading), and fewer remaining optical elements to use for encoding data or information.

In some configurations, finder optical elements enable a machine vision system to determine the orientation of a 2D barcode. However, in other applications, the orientation of a 2D barcode can be assumed by a computing device processing the image of the 2D barcode (such as when the 2D barcode is on a sign or stationary object). In these applications, fewer finder optical elements (and bits of information) are required because orientation information is not required by the computing device to be encoded. The finder optical element as shown in code 100 can be quickly identified through a raster scan. In one instance, an optical code consistent with the present disclosure includes fewer than 36 finder optical elements. In another instance, an optical code consistent with the present disclosure includes, for example, fewer than 25, 23, 21, 19, 17, 15 or 13 finder optical elements.

The table below shows the number of finder optical elements, context optical elements, content optical elements, total optical elements and bits of data that can be encoded in optical codes of various sizes consistent with the present disclosure. While these are examples of codes sizes, other code of varying sizes consistent with the present disclosure can be created extrapolating the optical element information below. In the table below, the number of finder optical elements is based on a crossed centric pattern for finder optical elements. There may be more or fewer finder optical elements depending on the pattern used. Additionally, the number of content optical elements listed assumes that content optical elements are 25% of the area of a standard or context optical element. A code may be designed with more or fewer context or content optical elements depending on the need of the desired application. The number of encoded data bits compensates for the variability between content and context optical elements and assumes that each standard bit size encodes one bit of data (excluding the finder optical elements).

TABLE 1

Example code sizes and optical element distribution

| Finder Optical elements | Context Optical elements | Content Optical elements | Total Optical elements | Encoded Data Bits |
|---|---|---|---|---|
| 13 | 24 | 36 | 76 | 63 |
| 17 | 48 | 48 | 117 | 100 |
| 21 | 80 | 60 | 166 | 145 |
| 25 | 120 | 72 | 223 | 198 |
| 29 | 168 | 84 | 288 | 259 |
| 33 | 224 | 96 | 361 | 328 |
| 37 | 288 | 108 | 442 | 405 |
| 41 | 360 | 120 | 531 | 490 |

Finder optical elements can be arranged in a variety of ways in an optical code 100. While finder optical elements are arranged in a centric crossed pattern in code 100, other placements or configurations for finder optical elements include placing three white optical elements at each corner. An additional variation of includes alternating clocking pixels (white, black) along one or more edges between adjacent corner optical elements. Other locations for finder optical elements in a code consistent with the present disclosure will be apparent to one of skill in the art upon reading the present disclosure.

Context (i.e., parent) optical elements are generally bits or optical elements that encode machine readable data or information related to the article or object, or location or environment of the article or object, that code 100 is on. In one instance, context optical elements are the same size and/or have the same retroreflective property as finder optical elements, and are detectable by a machine vision system from a first distance and/or at a first light source intensity, the same distance at which the finder optical elements are detectable. Such a distance and light source intensity is dependent upon the size and/or the retroreflective property of 2D code, the number of optical elements in the 2D code, the size and/or the retroreflective property of each optical element and the resolution of the machine vision system detecting the 2D code. Examples of data encoded in context optical elements include: location of article or object, manufacturing information related to article or object, classification of a traffic sign the code is on, law or other driving restrictions applicable to a particular area, time, date, or weather conditions, the traffic lanes to which the sign applies. Other types of information will be apparent to one of skill in the art upon reading the present disclosure. In FIG. 1, optical elements A2, A3, B2, B3, B5, B6, B7, C2, C3, C5, C6, C7, E1, E2, E3, E5, E6, F1, F2, F3, F5, F6, G5 and G6 are all context optical elements. Of these optical elements, for purposes of illustration only, optical elements A2, B2, B5, B6, B7, C2, E6, F1, F2, F3, F6, and G6 corresponding to "1's" and the remainder of the context optical elements correspond to "0's" because mapping between the grayscale color or shading for 1's corresponds to the grayscale color or shading for optical elements A2, B2, B5, B6, B7, C2, E6, F1, F2, F3, F6, and G6.

A variety of coding techniques can be used to encode information into code 100. One such exemplary technique is a Reed-Solomon code, as will be understood by one of skill in the art, and as described in "Reed-Solomon Error Correction by C. K. P. Clarke. R&D White Paper WHP031. July 2002, available at: http://downloads.bbc.co.uk/rd/pubs/whp/whp-pdf-files/WHP031.pdf, incorporated herein by reference. Other types of error correction codes that could be used consistent with the present disclosure include a Golay code, a Low Density Parity Check code, and a Turbo code. Other types of codes will be apparent to one of skill in the art. In code 100, using a base three extended Reed-Solomon code, the context optical elements may embed 12 bits of information in the 24 total context optical elements. Up to two optical elements may be occluded or lost, and the data encoded in the context optical elements is still recoverable. Using the encoding for code 100 described herein, if the context optical elements represent the type of sign, up to 4096 unique signs may be classified.

Code 100 also includes 36 content (i.e., child) optical elements, four of each are in larger optical elements A1, B1, C1, E7, F7, G1, G2, G3 and G7. Content optical elements are detectable by a machine vision system from a second distance (but not detectable by a machine vision system at a first distance) or at a second light source intensity (but not detectable by a machine vision system using a first light source intensity), where the second distance is less than the first distance and the second light source intensity is higher than the first light source intensity. Content optical elements are generally bits or optical elements that encode machine readable data or information related to the article or object, or location and environment of the article or object, that code 100 is on. Content optical elements can be used to extend information encoded in context optical elements. For example, if a context optical element indicates that the article is a speed limit sign, content optical elements may be used to indicate that the speed limit is 55 miles per hours in the zone the sign is located in. In this way, content information may be descriptive of the context information. The distance and the light source intensity at which content optical elements can be read by a machine vision system is dependent upon the size and/or the retroreflective property of the code 100, the number of optical elements in code 100, the size and/or the retroreflective property of each optical element, and the resolution of the machine vision system.

The content optical elements in A1, B1, C1, E7, F7, G1, G2, G3 and G7 may encode a variety of types of information, including information specific to a sign, such as a speed limit instructional information. GPS coordinates, or an asset number. Content optical elements can also be used to operate as further error correction for context optical elements.

Data may be encoded in content optical elements in a variety of ways or using a variety of algorithms. One such algorithm is a base-6 Reed-Solomon code, which allows for 12 bits of data to be encoded in the content optical elements. Because the content codes are generally smaller than context codes, the likelihood of a content optical element being misread or occluded from the field of vision of the machine vision system is increased. Using a base-6 Reed-Solomon encoding scheme can provide for additional redundancy or error-checking as compared to the base-3 Reed-Solomon code for the context optical elements. Up to 12 of the adjacent content optical elements can be occluded in this specific configuration, and the data from the content optical elements can be read accurately.

Optical elements A5, A6 and A7 may be used to add custom data to a sign at time of installation. In one instance, they may all appear white, and information, such as the lane the sign applies to, can be indicated by an installer by adding an IR black material over the desired optical elements.

While code 100 is shown as a 7×7 matrix, as determined by the size of the finder optical elements, other codes are within the scope of the present disclosure. For example, a code may be 8×8, 9×9, 10×10, 11×11, 12×12, 13×13, N×N, or N×M. In some configurations, a code consistent with the present disclosure may not be a square matrix. An optical code may be circular, triangular, a polygon, rectangle, or any desired irregular shape. The size of such an optical code can be determined by calculating the total number of standard optical elements, using the size of a finder optical element to determine the standard size of a single optical element.

Figure 2A:
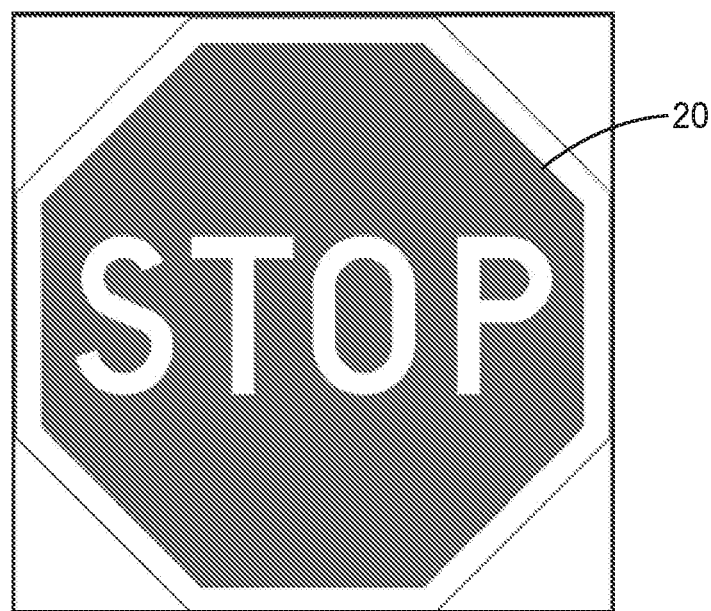
FIG. 2A is an exemplary figure of a machine readable optical code on a sign.

FIG. 2A is an exemplary figure of a sign 20 that may include a machine-readable optical code, in accordance with this disclosure. Sign 20 is an example of a traffic sign placed on many roads throughout the United States. An optical code consistent with the present disclosure may be applied to any sign, as an example, or to any other article. In one instance, such as FIG. 2A, an optical code may created to be visible only in the infrared spectrum, so that it is not seen by drivers or by the human eye in visible light, but can be read by machine vision system in IR light. Other methods for implementing an optical code consistent with the present disclosure are discussed throughout, and will be apparent to one of skill in the art upon reading the present disclosure.

Figure 2B:
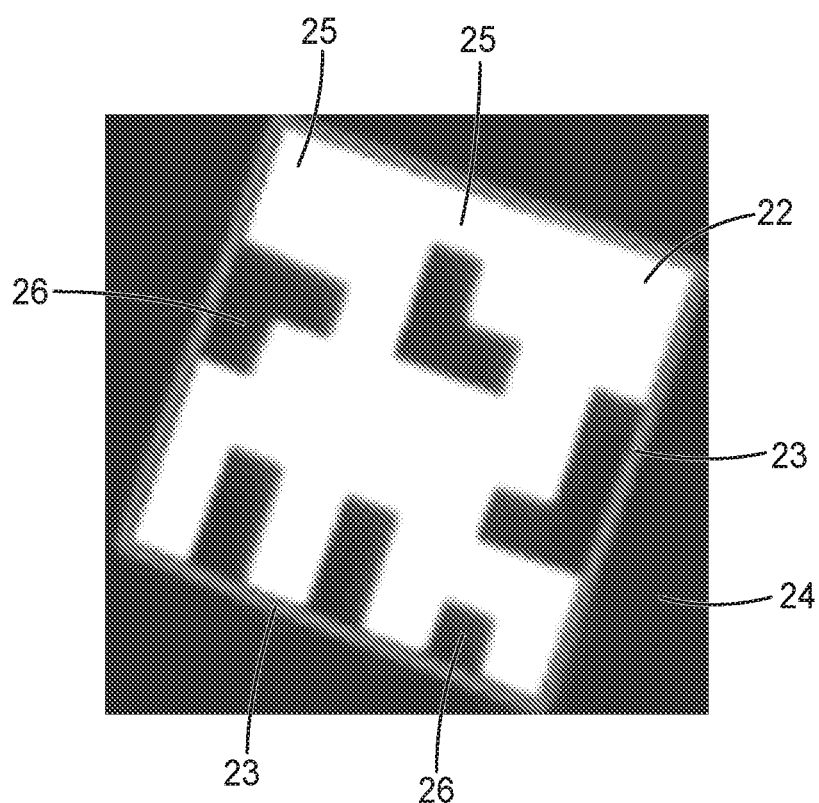
FIG. 2B is an exemplary figure of a machine readable optical code on a sign at as seen in the infrared spectrum.

FIG. 2B is an exemplary figure of a machine readable optical code 22 on a sign (e.g., sign 20 of FIG. 2A) as seen in the infrared spectrum. Optical code 22 has transition edges 23 that assist a machine vision system in detecting where optical code 22 begins and ends. Transition edges can be created in a variety of ways on a retroreflective surface or sign as discussed herein. Portions 24 of sign 20 surround optical code 22 because optical code 22 is a different shape than sign 20. Optical code 22 has a 7×7 matrix size, using the size of the primary (or context optical elements) for size calculation. Optical code 22 includes optical elements that represent both "1's" (25) and "0's" (26) that include finder, content, and context optical elements.

Figure 3:
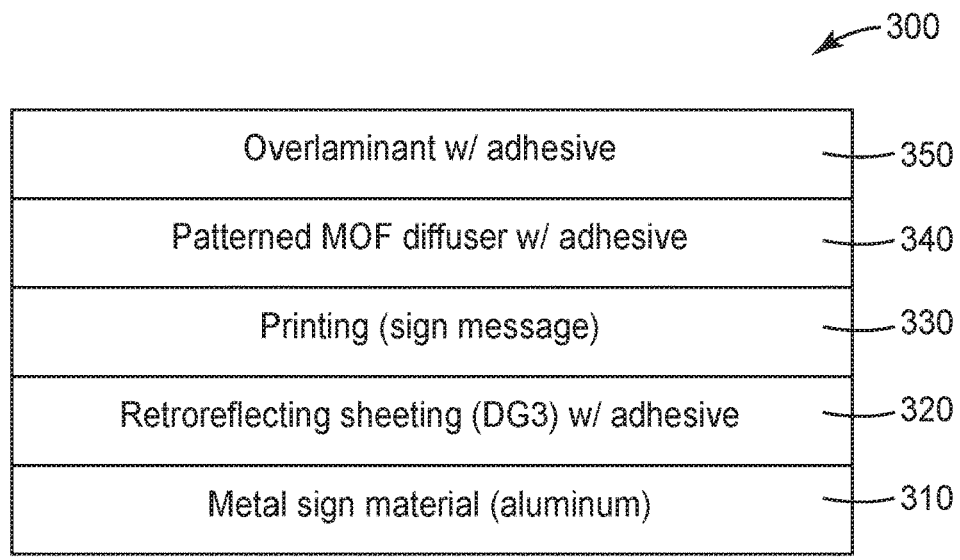
FIG. 3 is an exemplary sign construction consistent with the present disclosure.

FIG. 3 is an exemplary sign construction 300, in accordance with the present disclosure. While an optical code consistent with the present disclosure can be applied to any article, whether mobile or stationary. FIG. 4 illustrates an embodiment wherein an optical code is applied to a sign with retroreflective sheeting embodied thereon. FIG. 3 illustrates a cross section of such a sign with multiple layers, retroreflective sheeting and an optical code as described herein. Layer 410 is a substrate. Typically substrate 410 is a rigid or inflexible and durable material, such as a metal. One such suitable metal is aluminum. In other embodiments, substrate 410 may be or include any rigid, semi-rigid, or flexible surface.

Retroreflective sheet 320 may be a retroreflective sheet as described in this disclosure. A layer of adhesive (not shown) may be disposed between retroreflective sheet 320 and substrate 310 to adhere retroreflective sheet 320 to substrate 310. One example of retroreflective sheeting that may be used consistent with the present disclosure is 3M Diamond Grade™ DG$^3$ Reflective Sheeting Series 4000, available from 3M Company of St. Paul, Minn.

Layer 330 includes a message or image, which is typically printed onto layer 320. Layer 330 may be a traffic sign image, such as the stop sign shown in FIG. 2A. Layer 330 may include any message or image in the visible light spectrum, or a message or image that visible at a wavelength other than the optical code in layer 340. Examples of including information or images visible at different wavelengths in a single sign, license plate, or other substrate, are described in more detail in U.S. Pat. No. 8,865,293, which is expressly incorporated by reference herein in its entirety.

Layer 340 includes an optical code consistent with the present disclosure, such as the optical codes shown in FIG. 2B. An optical code in layer 340 may be formed in a variety of ways. For example, if optical code 340 is designed to be visible in the visible spectrum, it can be printed with a dark color (such as black) onto a light (or white) substrate. If an optical code in layer 340 is designed to be visible in the IR spectrum (typically in the range of 700-1000 nm, though in some instances, a wave length such as 850 nm or 900 nm may be used), optical code in layer 440 could be created in a variety of ways. Specifically, with retroreflective layer 320 beneath layer 340, any portion of layer 320 that is not covered with a material or substance that absorbs, scatters, or otherwise inhibits retroreflection in the infrared spectrum will appear white or light. Thus applying a material that absorbs, scatters or otherwise kills retroreflection in the infrared spectrum can be used to create black optical elements and a boundary around an optical code in layer 340.

Examples of materials that may be used include printing portions of the sign desired to be black or dark using an IR-absorbing black ink. In another instance, an IR absorbing multi-layer optical film (MOF) can be selectively cut such that any portions of the sign desired to be white are removed, and the film is overlaid on layer 330. When viewed in the infrared spectrum, the film will only allow retroreflection in the areas of the optical code that are intended to be white. While the infrared (IR) spectrum is discussed herein, other spectrums can be used, such as the near infrared spectrum (light with wavelengths of approximately 950 nm). When the optical code in layer 340 is created 950 nm light absorbing film, when light at 950 nm illuminates the optical code, the black printed sections will absorb the light and appear black to the machine vision system, and the unprinted sections will appear bright or white.

Sign 300 may optionally include an overlaminate 350 that it is formed or adhered over layer 340. Overlaminate 350 may be constructed of a visibly-transparent, infrared transparent material, such as but not limited to multilayer optical film.

The use of a retroreflective layer in the construction of sign 300 can provide several advantages. For example, when information is captured primarily in the infrared spectrum, and the only visible areas in an image are the bright or white optical elements created by the light reflecting from retroreflective sheeting 320, the lighting conditions returned to the camera may create difficulty for the image capture device and/or computing device to identify any objects that are not IR retroreflective in an image. This includes the background around a sign or an optical code, and other personal information, such as an individual's face, image, or other identifying information.

Further, retroreflected light from layer 340 that generates the white or bright portions of an optical code may result in an image with a very stark contrast between black areas in an image, including a natural boundary or transition between an optical code and the surrounding image. Such a transition is shown as item 23 in FIG. 2B. In some existing QR codes, black optical elements may be necessary around the entire or a part of a boundary of the code to delineate for a machine vision system where the QR code begins and ends. In contrast, because the area surrounding an optical code on sign 300 will appear black in the IR spectrum, no additional boundary optical elements are required, allowing greater encoding efficiency.

Figure 4A:
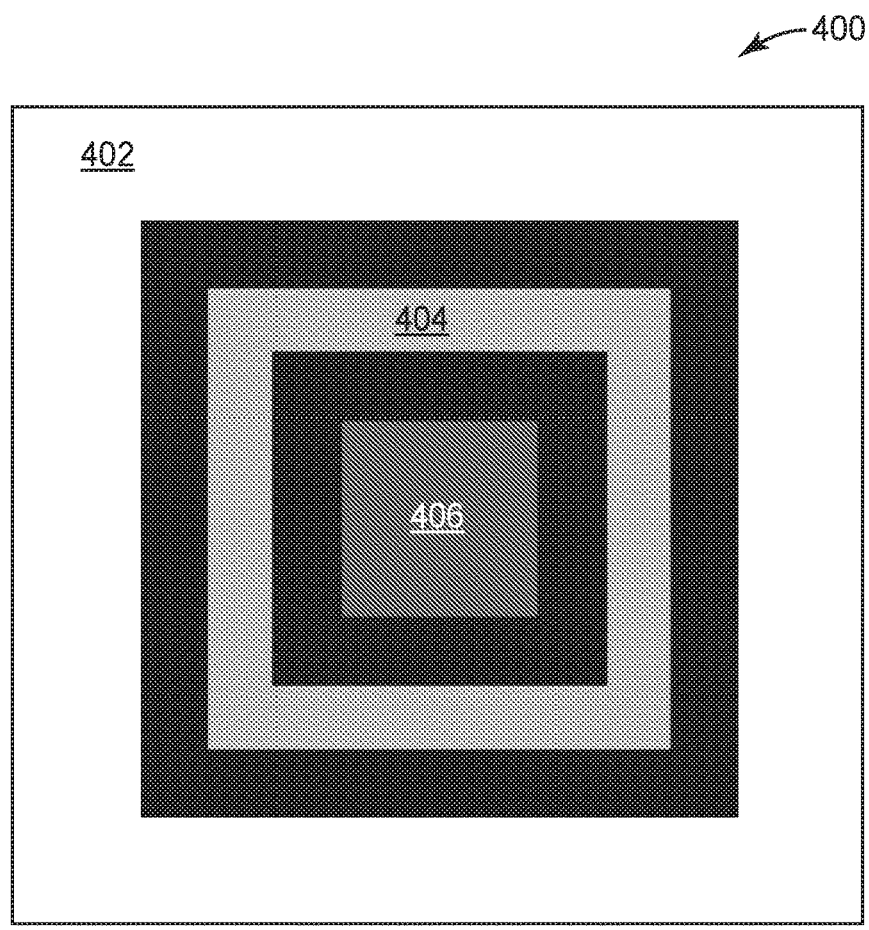
FIG. 4A is an exemplary machine-readable optical code with nested content optical elements.

FIG. 4A shows an illustrative machine-readable optical code 400 with optical elements of three levels. In some examples, a parent optical element set 402 may include material having a relative high retroreflective coefficient (e.g., 500). In some examples, a child optical element set 404 may include material having a retroreflective coefficient (e.g., 200) lower than the material for the parent optical element set 402. In some examples, a $2^{nd}$ level child optical element set 406 may include material having a retroreflective coefficient (e.g., 50) lower than the material for the child optical element set 404.

In some examples, a first encoded value that corresponds to at least one parent optical element in the parent optical element 402 is decodable at a particular distance between an image capture device and the article that is greater than or equal to a threshold distance. A second encoded value that correspond respectively to at least one child optical element 404 may not be decodable at the particular distance between the image capture device and the article. In some examples, the particular distance is a first distance, wherein the second encoded value that correspond to the child and parent optical element sets are decodable at a second distance between the image capture device and the article, the second distance being less than the first distance. In some examples, the second encoded value is associate with both the parent optical element set 402 and the child optical element set 404. In some examples, the threshold distance is a distance at which a resolution of an image captured by the image capture device does not visually differentiate, above a differentiability threshold, between one or more optical elements of the child optical element set that are visually different. In some examples, the differentiability threshold may be user-defined, hard-coded, or machine-generated. In some example, a third encoded value that corresponds to at least one $2^{nd}$ child optical element 406 is decodable at a third distance between the image capture device and the article, the third distance being less than the second distance. In some examples, the third encoded value is associated with the child optical element set 404 and the $2^{nd}$ child optical element set 406. In some examples, the third encoded value is associated with the parent optical set 402, the child optical element set 404 and the $2^{nd}$ child optical element set 406.

In some examples, a first encoded value that corresponds to at least one optical element of a parent optical element is decodable using a particular light source intensity that is greater than or equal to a threshold intensity. A second encoded value that correspond respectively to at least one child optical element 404 may not be decodable at the particular light source intensity. In some examples, the second encoded value is associate with both the parent optical element set 402 and the child optical element set 404. In some examples, the particular light source intensity is a first light source intensity, wherein the second encoded value that correspond to the child optical element 404 are decodable using a second light source intensity, the second light source intensity higher than the first light source intensity. In some examples, the threshold intensity is a light source intensity at which a resolution of an image captured by the image capture device does not visually differentiate, above a differentiability threshold, between one or more optical elements of the child optical element set that are visually different. In some examples, the differentiability threshold may be user-defined, hard-coded, or machine-generated. In some example, a third encoded value that corresponds to at least one $2^{nd}$ child optical element 406 is decodable using a third light source intensity, the third light source intensity higher than the second light source intensity. In some examples, the third encoded value is associated with the child optical element set 404 and the $2^{nd}$ child optical element set 406. In some examples, the third encoded value is associated with the parent optical set 402, the child optical element set 404 and the $2^{nd}$ child optical element set 406.

Figure 4B:
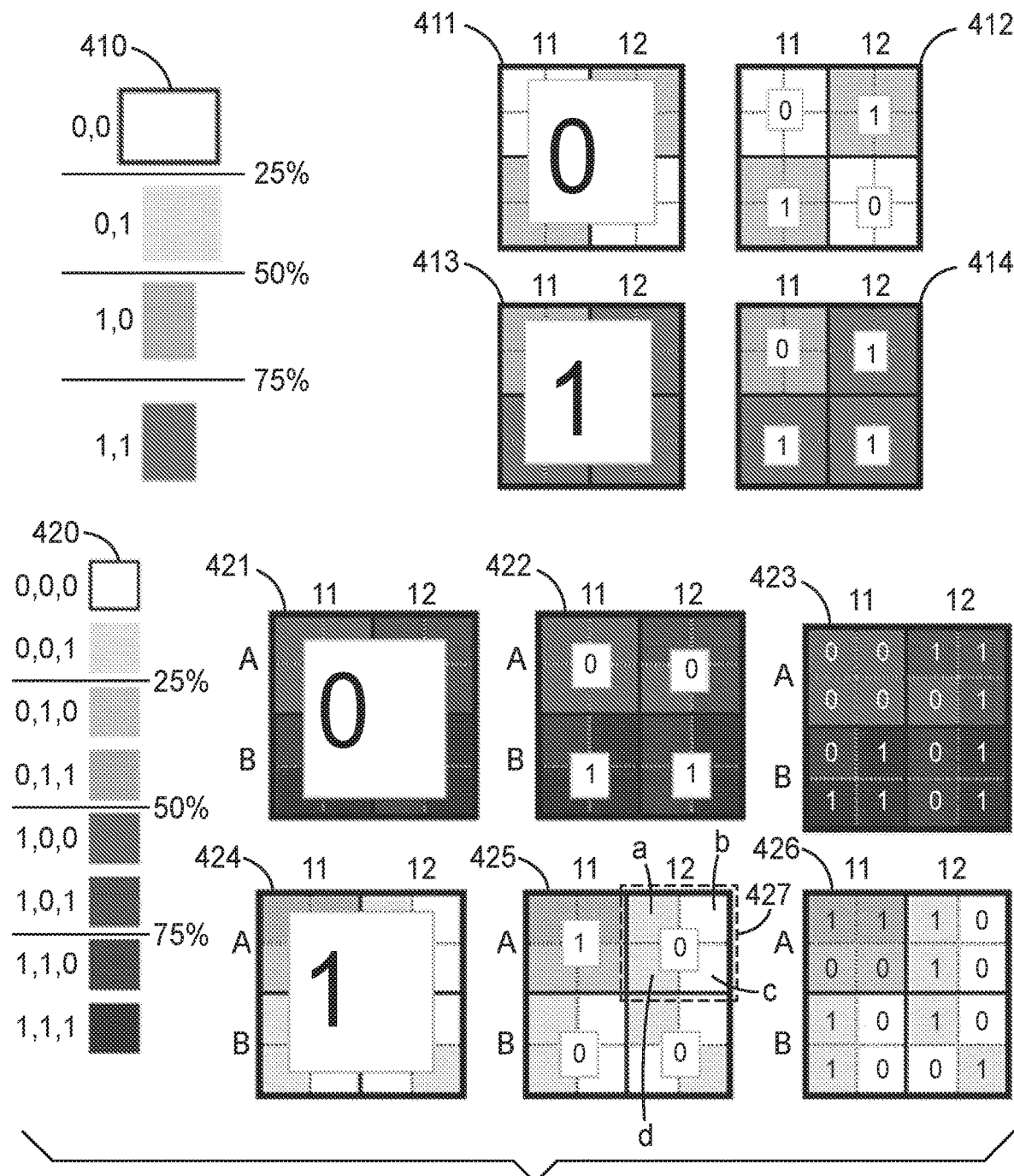
FIG. 4B shows sections of a machine readable optical code with nested content optical elements.

FIG. 4B illustrates sections of a machine readable optical code with nested parent and child optical elements. In many machine vision systems, the system determines whether an optical element is "white" or "black" by detecting the lightest tone in an image and the darkest tone in an image. The machine then "binarizes" the image by determining that anything that is darker than the tone that is half-way between the detected white and black is determined to be black. Anything that is lighter than the half-way (or 50%) tone is determined to be white. This same principle can be applied when multiple layers of content optical elements are nested.

FIG. 4B further illustrates a hierarchy of parent and child optical element sets embodied on a physical surface, with the grayscale values representing retroreflective properties. For instance, optical element set 424 (also pictured as 425 and 426 at different levels of detail) may be a parent optical element set A11 with four child optical element sets A12, B11, B12. The parent optical element set includes a first plurality of optical elements, each having a parent level retroreflective property. A child optical element set 427 includes a second plurality of optical elements A12a, A12b, A12c, and A12d, each having a child level retroreflective property. In the example of FIG. 4B, a first encoded value ("1") represented by the optical element set 424 is based at least in part on a visual appearance of the parent optical element A11, and a second encoded value ("1000") is based at least in part on the visual appearance of the parent optical element set A11 and the child optical element sets (A12, B11, and B12), the first and second encoded values being different. The second encoded value ("1000") may not be decodable from a distance greater than a threshold distance or at a light source intensity lower than a threshold intensity, the first encoded value ("1") being decodable from the distance greater than the threshold distance or at the light source intensity lower than the threshold intensity. In some examples, a child optical element set may be included within one optical element of the parent optical element set. In other examples, a child optical element set may not overlap or be included within the parent optical element set.

By arranging encoded values in a hierarchical manner as shown in FIG. 4B, more important information (e.g., the presence of a STOP sign) can be encoded in optical elements at higher levels of the hierarchy (e.g., parent optical element sets) which can be decoded from further distances away between an image capture device or at a lower light source intensity and the article including the optical elements. Lesser important information (e.g., manufacture date of the article), can be encoded in optical elements at lower levels of the hierarchy (e.g., child optical element sets), which may be decoded only when the image capture device is nearer to the article that includes the optical elements. Any N-number of hierarchical levels of optical elements sets may be used.

Another example of layered content optical element is shown in blocks 11-12, columns C-D. When creating code 400, block 411 comprised of blocks 11-12, rows C-D are cumulatively decoded as a "0" when read together as a single block (as a context optical element). Because the machine vision system detects shade 0,0 shown in scale 410 as the lightest color in the region and shade 1,1 shown on scale 410 as the darkest color, in order for all of the blocks in optical element C-D, 11-12 to be read as a "0", the shade in each of the four blocks in 411 must be below the 50% line on scale 410.

To read or otherwise decode the information nested in each of the four content optical elements in block 411, a machine vision system can isolate block 411 and calibrate its binarizer to the shades only in block 411. Because the shades are below the 50% line of scale 410, the binarizer then determines that any region with a black level (e.g., based on luminance) below the 25% line is a "0", and anything above the 25% line is a "1". Therefore, even though the four blocks in 411 and 412 would be read as a "0" when read together as a single optical element, when read individually, as content optical elements, individual components may be read with a different value.

Similarly, block 413, when read from a first distance or a first light source intensity as a context optical element, needs to be read as a "1". To achieve this, only shades greater than the 50% line on scale 410 are used, such that when context optical element 413 is read from a first distance, the machine vision system determines that all four blocks are "dark" or "black" because they are above the 50% line on the grayscale. When the content optical elements in block 414 are read individually—"0111", based on the machine vision system looking only at the grayscale range above the 50% line when reading block 414 in isolation. In some examples, a visual appearance is or may be represented by a visual grayscale value indicating a degree of luminance in a range of grayscale values having different degrees of luminance.

Blocks or optical elements 421-426 demonstrate an implementation using three levels of nested data. Block 421, when read from a first distance or at a first light source intensity, is a "1" because all shades are greater than the 50% line on scale 420. However, when read from a second, nearer distance or at a second, higher light source intensity, (as shown on block 422) optical elements A11 and A12 are read as "0" because the shades within each of these optical elements is below the 75% line, which has become the division point used to binarize block 422. Optical elements B11 and B12 are read as 1. When block 423 is read from a third (and closest) distance or a third (and highest) light source intensity, a machine vision system is able to detect that each of optical elements A11, A12, B11 and B12 is made of four nested optical elements. In optical elements A11 and A12, the color spectrum ranges only between 1,0,0 and 1,0,1 on scale 420, so the four nested optical elements in A11 are read as 0,0,0,0 and the four nest optical elements in A12 are read as 1,0,1.

Optical element 424 is encoded as a "0" when read as a single context optical element at a first distance and/or first light source intensity, so all shades used within optical element 424 are below the 50% black-level line on scale 420. When block 425 is read as four separate content optical elements at a second distance and/or a second light source intensity, optical element A11 is a "1" and A12, B11 and B12 are each "0". Block 426 can be read at a third distance nearer than either of the first or second distance, or at a third light source intensity greater than either of the first or second light source intensity, in which each content optical element mentioned with respect to block 425 can now be read as four separate content optical elements. The content optical elements in block A11 are 1,1,0,0. The content optical elements in block A12 are 1,0,1,0. The content optical elements in block B11 are 1,0,1,0 and the content optical elements in block B 12 are 1,0,0,1.

While a specific method for nesting content and context optical elements is described herein, other methods in the scope of the present disclosure will be apparent to one of skill in the art upon reading the present disclosure. While the present disclosure specifically describes two-level nesting, and three-level nesting, any desired level of nesting can be achieved based on the limitations of the image capture and processing technology. For example, to implement a code with five-level nesting, the grayscale scale will need to be divided into $2^5$, or 32 grayscales of color (or gray).

Figure 5:
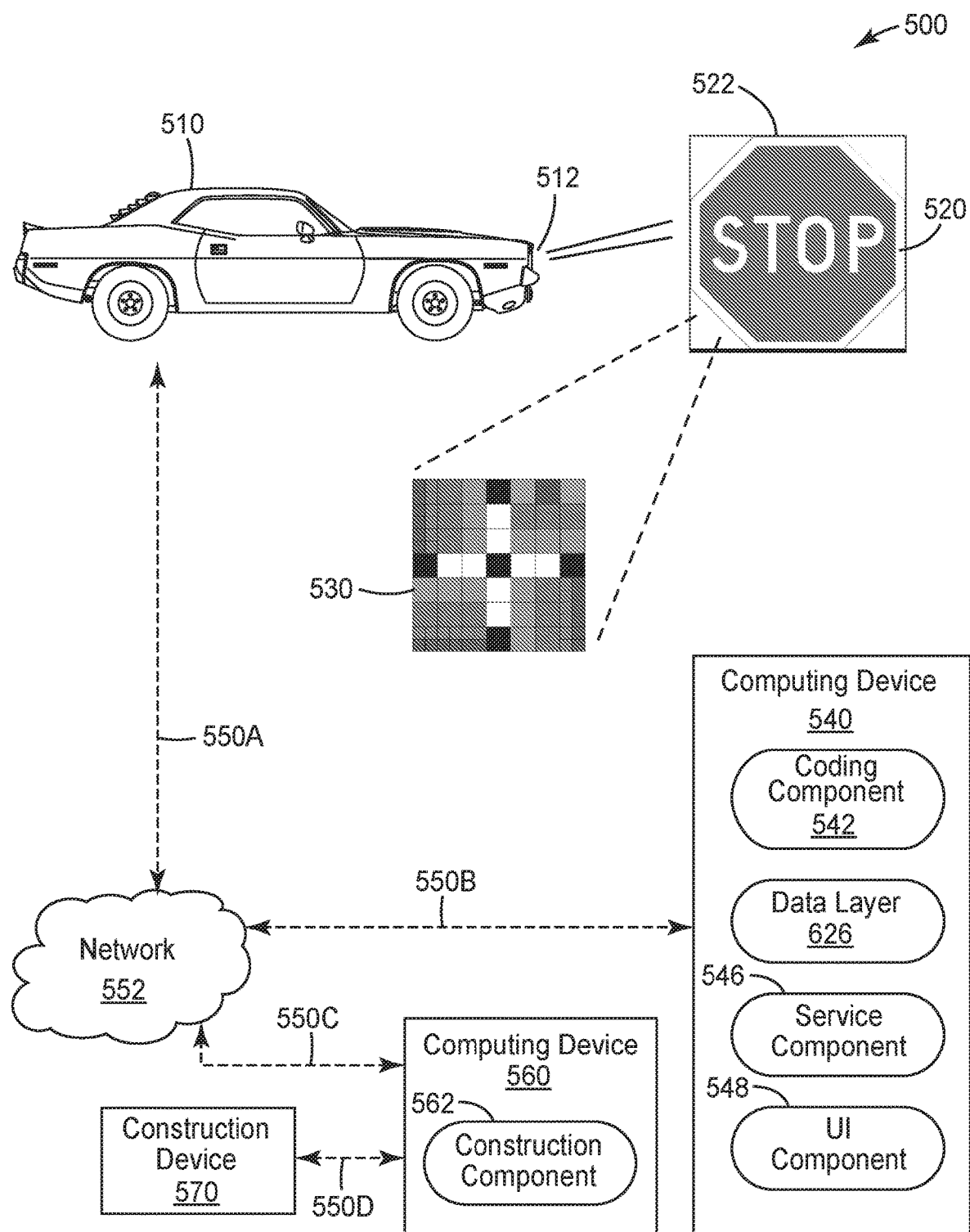
FIG. 5 is an example of a system for reading a multi-dimensional machine-readable optical code.

FIG. 5 is an example of a system 500 for reading a multiscale machine-readable optical code. System 500 includes sign 520. Sign face 522 includes an image that can be seen in the visible light spectrum, stop image 522, and a machine readable optical code 530, which may be visible in the visible light spectrum outside of the visible light spectrum. Sign 500 has a substrate, and may also include a layer of retroreflective sheeting behind the optical code 530.

Optical code 530 includes a plurality of finder optical elements arranged in a pattern and detectable by a machine vision system 512 mounted on vehicle 510 in a first condition, for example, from a first distance, or using a light source with a first light intensity. Optical code 530 also includes a plurality of context optical elements, i.e., a parent optical element set, representing context information, wherein the context optical elements are detectable by a machine vision system in the first condition. The optical code 530 also includes a plurality of content optical elements, i.e., a child optical element set, representing content information, wherein the content optical elements are not detectable by a machine vision system in the first condition, but are detectable by a machine vision system in a second condition for example, from a second distance, or using a light source with a second light intensity, where the second distance is lesser than the first distance and/or the second light intensity is higher than the first light intensity.

As vehicle 510 approaches sign 520, machine vision system 512 detects and processes the machine readable optical code. While machine vision system 512 is shown as mobile and mounted to vehicle 510 in FIG. 5, machine vision system may be stationary or may be mounted to other equipment or devices. Machine vision system 512 may be an infrared camera, including an image sensor and a light source. In some instances, a machine vision system will include a filter to increase the sensitivity of the image sensor to the IR spectrum. Other types of machine vision systems will be apparent to one of skill in the art upon reading the present disclosure.

Machine vision system 512 can include computing device 540 such that it is directly connected with computing device 540 via a wired or wireless connection that does not require a network. In other instances, machine vision system 512 can be communicatively coupled with computing device 540, using one or more communication links 550A, 550B.

Machine vision system 512 may send images of optical codes to computing device 540. Communication links 550A and 550B may represent wired or wireless connections. For instance communication links 550A and 550B may be wireless Ethernet connections using a WiFi protocol and/or may be wired Ethernet connections using Category 5 or Category 6 cable. Any suitable communication links are possible. In some examples, machine vision system 512 is communicatively coupled to computing device 540 by a network 552. Network 552 may represent any number of one or more network connected devices including by not limited to routers, switches, hubs, and interconnecting communication links that provide for forwarding of packet and/or frame-based data. For instance, network 552 may represent the Internet, a service provider network, a customer network, or any other suitable network. In other examples, machine vision system 512 is communicatively coupled to computing device 540 by a direct connection, such as Universal Serial Bus (USB) link.

Computing device 540 represents any suitable computing system, which may be a single device with or remote from machine vision system 512, such as one or more desktop computers, laptop computers, mainframes, servers, cloud computing systems, etc. capable of sending and receiving information with machine vision system 512. In some examples, computing device 540 implements techniques of this disclosure.

In the example of FIG. 5, computing device 540 includes coding component 542, data layer 626, service component 546 and user interface (UI) component 548. Coding component 542 can detect the data encoded in optical code 530 by applying the required data encoding scheme or algorithm to the data on optical code 530. Coding component 542 may query data layer 626 to convert a detected binary code from optical code 530 to machine readable information.

Service component 546 may provide any number of services, by performing one or more operations. For instance, service component 546, upon receiving data read from the optical code may generate one or more alerts, reports, or other communications that are sent to one or more other computing devices, including an auto-drive component on vehicle 510. Such alerts may include but are not limited to: emails, text messages, lists, phone calls, or any other suitable communications. In some examples, user interface (UI) component 548 may act as an intermediary between various components and optical elements of computing device 540 to process and send input detected by input devices to other components and optical elements, and generate output from other components and optical elements that may be presented at one or more output devices. For instance. UI component 548 may generate one or more user interfaces for display, which may include data and/or graphical representations of alerts, reports, or other communications.

Components 542, 626, 546, and 548 may perform operations described herein using software, hardware, firmware, or a mixture of both hardware, software, and firmware residing in and executing on computing device 540 and/or at one or more other remote computing devices. In some examples, components 542, 626 and 546 may be implemented as hardware, software, and/or a combination of hardware and software. Computing device 540 may execute components 626, 546 and 548 with one or more processors. Computing device 540 may execute any of components 542, 626, 546 or 548 as or within a virtual machine executing on underlying hardware. Components 542, 626, 546, 548 may be implemented in various ways. For example, any of components 542, 626, 546 or 548 may be implemented as a downloadable or pre-installed application or "app." In another example, any of components 542, 626, 546 or 548 may be implemented as part of an operating system of computing device 540.

For example purposes in FIG. 5, machine vision system is illustrated as part of or mounted to vehicle 510. Vehicle 510 may be an automobile, motorcycle, airplane, water vessel, military equipment, bicycle, train, or any other transportation vehicle. In other examples, machine vision system 512 may be attached to, included or embedded in, or otherwise comprise: a document, clothing, wearable equipment, a building, stationary equipment, or any other object to name only a few examples.

Optical code 530 is shown as incorporated as a sign in FIG. 5, however optical code may be mounted on, attached to, included or embedded in: a document, clothing, wearable equipment, a building, stationary equipment, or any other object to name only a few examples.

In some examples, optical code 530, or an article optical code 530 is attached to may include reflective, non-reflective, and/or retroreflective sheet applied to a base surface. A visible message, such as but not limited to characters, images, and/or any other information, may be printed, formed, or otherwise embodied on optical code 530 article. The reflective, non-reflective, and/or retroreflective sheet may be applied to a base surface using one or more techniques and/or materials including but not limited to: mechanical bonding, thermal bonding, chemical bonding, or any other suitable technique for attaching retroreflective sheet to a base surface. A base surface may include any surface of an object (such as described above, e.g., an aluminum plate) to which the reflective, non-reflective, and/or retroreflective sheet may be attached. An article message may be printed, formed, or otherwise embodied on the sheeting using any one or more of an ink, a dye, a thermal transfer ribbon, a colorant, a pigment, and/or an adhesive coated film. In some examples, content is formed from or includes a multi-layer optical film, a material including an optically active pigment or dye, or an optically active pigment or dye.

To initially manufacture or otherwise create optical code 530, construction device 570 may be used in conjunction with computing device 560, which controls the operation of construction device 570. In some examples, construction device 570 may be any device that prints, disposes, or otherwise forms optical code 530 and/or sign 520. Examples of construction device 138 include but are not limited to a needle die, gravure printer, screen printer, thermal mass transfer printer, laser printer/engraver, laminator, flexographic printer, an ink-jet printer, an infrared-ink printer. In some examples, optical code 530 may be enabled by the retroreflective sheeting or infrared absorbing or scattering film constructed by construction device 570, and a separate construction process or device, which is operated in some cases by a different operators or entities than computing device 560, may apply the article message to the sheeting and/or the sheeting to the base layer (e.g., aluminum plate).

Construction device 570 may be communicatively coupled to computing device 560 by communication link 550D. Computing device 560 may control the operation of construction device 570. For instance, computing device 560 may include one or more printing specifications. A printing specification may comprise data that defines properties (e.g., location, shape, size, pattern, composition or other spatial characteristics) of the visible sign face 522 and optical code 530. In some examples, the printing specification may be generated by a human operator or by a machine. In any case, construction component 562 may send data to construction device 570 that causes construction device 570 to print a visible image or message and an optical code in accordance with the printer specification.

In some examples, construction component 562 may determine one or more probable regions or areas of a sign that are likely to be visually occluded. Such regions or areas may be defined by a user, hard-coded, or determined by construction component 562 based on one or more images that include at least the potential visually occlusion or a representation of an occlusion. In some examples, construction component 562 may output a graphical user interface in which a user can specify different regions or areas of a particular sign that may be visually occluded. Based on determining the regions or areas that may be visually occluded, construction component 562 may configure the block shapes, sizes and/or locations on the article to improve the likelihood that, if the one or more regions or areas of potential visual occlusion are occluded, then the message encoded in the optical element sets will still be decodable by a computing device. As an example, if a region or area in the upper right-hand quadrant of an optical code is likely to be visually occluded, construction component 562 may position optical element sets representing a message in locations other than the upper right corner, but may still include error correction data in optical elements sets positioned in the region or area of the upper right-hand quadrant. Any number of other possible distributions of size, shape, and location of optical elements are possible based on known or probable areas of visual occlusion for the machine readable code.

In some examples, to decode a message in the machine readable code, coding component 542 may determine, based at least in part on optical element set location data that indicates respective pre-defined locations of respective optical elements sets within the image, an optical element set. That is, optical element set location data may indicate coordinates or other location values that are mapped to different optical element sets and/or individual optical elements. Coding component 542 may determine, based at least in part on optical element location data that indicates respective pre-defined locations of respective optical elements within the optical element set, respective grayscale values for each of the respective optical elements. For instance, given a known mapping between a pre-defined location of an image and an optical element, coding component may measure or otherwise determine a gray scale value for that pre-defined location (which in some examples may be a single point or a set of points that correspond to pixels). Coding component 542 may determine, based at least in part on mappings between grayscale values and encoded values, at least a portion of the message. For instance, coding component 542 access one or more stored mappings between grayscale values and encoded values, and based on the detected grayscale values for optical elements, reconstruct a string of decoded values that represent a portion of the message.

In some examples, a computing device of a vehicle may need a set of fiducials (or navigation markers) by which to remove drift and uncertainty in GPS precision. Machine-readable codes of this disclosure and a unique or quasi unique ID that maps to data about objects or hazards in proximity to the article including the code may provide such fiducials. In some examples, machine-readable codes of this disclosure could also contain a redundancy spread between the content and context optical elements, so that a computing device of the vehicle can determine with sufficient confidence (e.g., above a threshold) that data referenced from the database applies to that specific traffic sign or article, and that there was not an error or counterfeit occurring with respect to the article. Such techniques and machine-readable codes may be extended to security, by which redundant information is stored locally and in the database, and which can be compared or validated by the computing device as an additional measure of security in this use case.

In some examples, a computing device of a vehicle or otherwise may validate that a sign is genuine and/or the message encoded in the machine-readable code is correct. In this way, such validation may provide higher confidence that a sign is placed where it should be and that it has a valid encoding.

For instance, a GPS location encoded in the machine-readable code may be compared to a determined GPS location by a vehicle at the time a sign is read. Other such comparisons are possible and within the scope and spirit of this disclosure.

Figure 6:
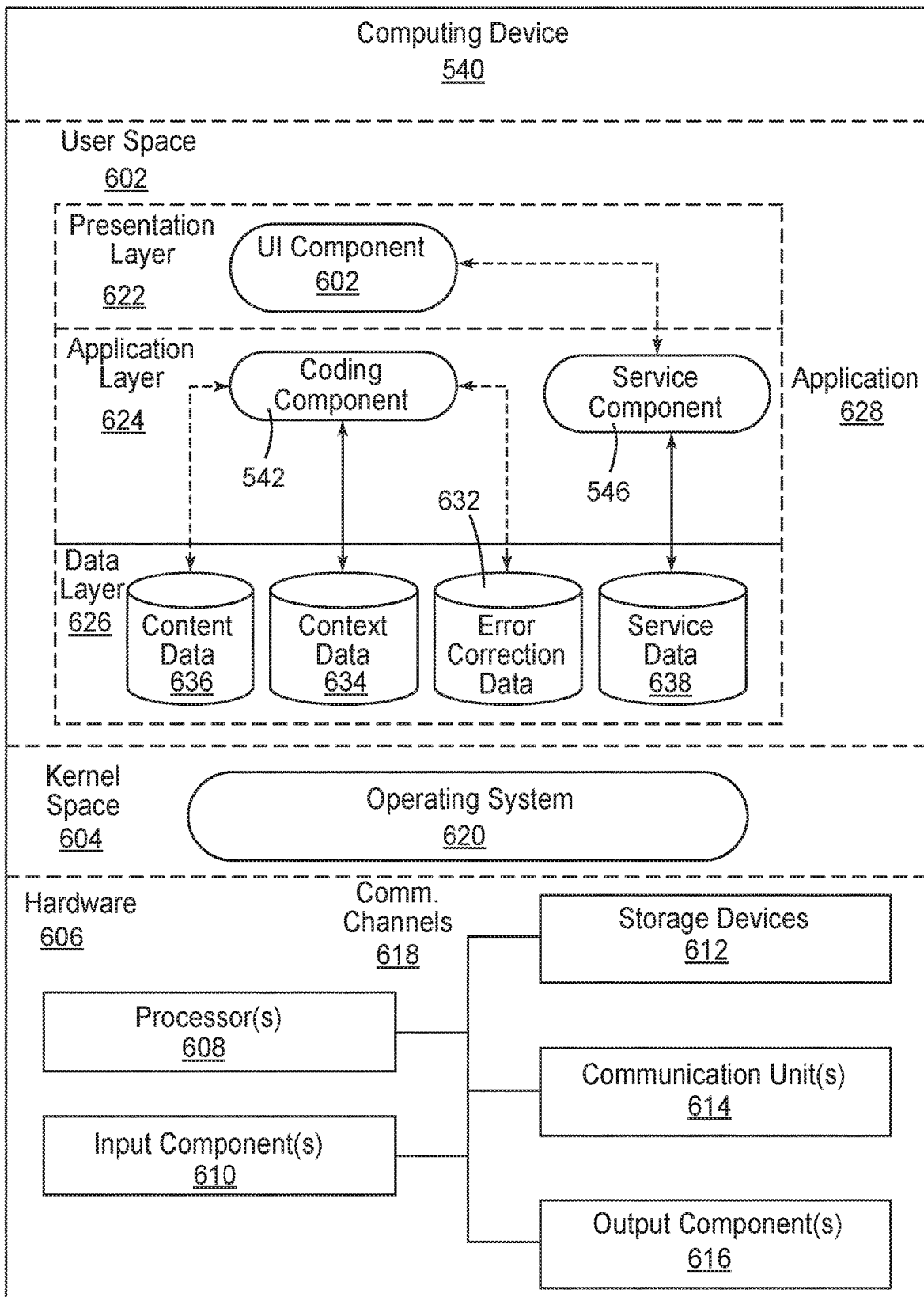
FIG. 6 is an example of a computing device for use in a system for reading a multi-dimensional machine-readable optical code.

FIG. 6 is an example of a computing device for use in a system for reading a multi-dimensional machine-readable optical code. FIG. 6 illustrates only one particular example of computing device 540, as shown in FIG. 5. Many other examples of computing device 540 may be used in other instances and may include a subset of the components included in example computing device 540 or may include additional components not shown example computing device 540 in FIG. 6. In some examples, computing device 540 may be a server, tablet computing device, smartphone, wrist- or head-worn computing device, laptop, desktop computing device, or any other computing device that may run a set, subset, or superset of functionality included in application 620.

As shown in the example of FIG. 6, computing device 540 may be logically divided into user space 602, kernel space 604, and hardware 606. Hardware 606 may include one or more hardware components that provide an operating environment for components executing in user space 602 and kernel space 604. User space 602 and kernel space 604 may represent different sections or segmentations of memory, where kernel space 604 provides higher privileges to processes and threads than user space 602. For instance, kernel space 604 may include operating system 620, which operates with higher privileges than components executing in user space 602.

As shown in FIG. 6, hardware 606 includes one or more processors 608, input components 610, storage devices 612, communication units 614, and output components 616. Processors 608, input components 610, storage devices 612, communication units 614, and output components 616 may each be interconnected by one or more communication channels 618. Communication channels 618 may interconnect each of the components 608, 610, 612, 614, and 616 for inter-component communications (physically, communicatively, and/or operatively). In some examples, communication channels 618 may include a hardware bus, a network connection, one or more inter-process communication data structures, or any other components for communicating data between hardware and/or software.

One or more processors 608 may implement functionality and/or execute instructions within computing device 540. For example, processors 608 on computing device 540 may receive and execute instructions stored by storage devices 612 that provide the functionality of components included in kernel space 604 and user space 602. These instructions executed by processors 608 may cause computing device 616 to store and/or modify information, within storage devices 612 during program execution. Processors 608 may execute instructions of components in kernel space 604 and user space 602 to perform one or more operations in accordance with techniques of this disclosure. That is, components included in user space 602 and kernel space 604 may be operable by processors 208 to perform various functions described herein.

One or more input components 642 of computing device 540 may receive input Examples of input are tactile, audio, kinetic, and optical input, to name only a few examples. Input components 642 of computing device 616, in one example, include a mouse, keyboard, voice responsive system, video camera, buttons, control pad, microphone or any other type of device for detecting input from a human or machine. In some examples, input component 642 may be a presence-sensitive input component, which may include a presence-sensitive screen, touch-sensitive screen, etc.

One or more output components 616 of computing device 616 may generate output. Examples of output are tactile, audio, and video output. Output components 616 of computing device 540, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 616 may be integrated with computing device 540 in some examples. In other examples, output components 616 may be physically external to and separate from computing device 540, but may be operably coupled to computing device 540 via wired or wireless communication. An output component may be a built-in component of computing device 540 located within and physically connected to the external packaging of computing device 540 (e.g., a screen on a mobile phone). In another example, presence-sensitive display 602 may be an external component of computing device 540 located outside and physically separated from the packaging of computing device 540 (e.g., a monitor, a projector, etc. that shares a wired and/or wireless data path with a tablet computer).

One or more communication units 614 of computing device 540 may communicate with external devices by transmitting and/or receiving data. For example, computing device 540 may use communication units 614 to transmit and/or receive radio signals on a radio network such as a cellular radio network. In some examples, communication units 614 may transmit and/or receive satellite signals on a satellite network such as a Global Positioning System (GPS) network. Examples of communication units 614 include a network interface card (e.g. such as an Ethernet card), an optical transceiver, a radio frequency transceiver, a GPS receiver, or any other type of device that can send and/or receive information. Other examples of communication units 614 may include Bluetooth®. GPS, 3G, 4G, and Wi-Fi® radios found in mobile devices as well as Universal Serial Bus (USB) controllers and the like.

One or more storage devices 612 within computing device 540 may store information for processing during operation of computing device 540. In some examples, storage device 612 is a temporary memory, meaning that a primary purpose of storage device 612 is not long-term storage. Storage devices 612 on computing device 540 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 612, in some examples, also include one or more computer-readable storage media. Storage devices 612 may be configured to store larger amounts of information than volatile memory. Storage devices 612 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 602 and/or kernel space 604.

As shown in FIG. 6, application 628 executes in userspace 602 of computing device 540. Application 628 may be logically divided into presentation layer 622, application layer 624, and data layer 626. Presentation layer 622 may include user interface (UI) component 548, which generates and renders user interfaces of application 628. Application 228 may include, but is not limited to: UI component 548, coding component 542, data layer 626, and one or more service components 546. Presentation layer 622 may include UI component 548.

Data layer 626 may include one or more datastores. A datastore may store data in structure or unstructured form. Example datastores may be any one or more of a relational database management system, online analytical processing database, table, or any other suitable structure for storing data.

Content datastore 634 may include: a series of bits consisting of the payload from content optical elements and the information associated with those series of bits. In some examples, content datastore 634 may include messages in encoded or decoded form. Context datastore 636 may include a series of bits consisting of the payload from context optical elements and the information associated with those series of bits. In some examples, context datastore 634 may include messages in encoded or decoded form. Error Correction Data 632 may include a series bits forming codewords constructed by the error correction algorithm which aids in reconstruction and verification of payload data found in the content optical elements and context optical elements. Service data 638 may include any data to provide and/or resulting from providing a service of service component 546. For instance, service data may include information about optically active articles (e.g., vehicle registration information), user information, or any other information.

Machine vision system 510 may capture an image including optical code 530, determine that an optical code 530 is present in the image using finder optical elements, and communicate it to computing device 540 through UI component 548 or communication channels 550A, and 550B. In response to receiving the image, coding component 542 may determine that a particular image region of the image represents an optical code. By applying one or more decoding techniques, such as a Reed-Solomon decoding or error detection technique, coding component 542 may determine, through communication with content datastore 636 and context datastore 634 that the optical code in the image represents a series of data indicating that a speed limit sign is ahead, and that the speed limit on the sign is 50 kilometers per hour.

Service component 546 may perform one or more operations based on the data generated by coding component 542, such as send data to UI component 548 that causes UI component 548 to generate an alert or report for output. In some examples one or more components may store a message indicating the decoded result or other data processed based on the result. In some examples, service component 546 may modify the operation of a vehicle. For instance, service component 546 may alter the velocity, acceleration, direction, suspension, brakes, or any other function of the vehicle. UI component 548 may send data to an output component of output components 616 that causes the output component to display the alert. While one particular implementation of a computing system is described herein, other configurations and embodiments of computing systems consistent with and within the scope of the present disclosure will be apparent to one of skill in the art upon reading the present disclosure.

Figure 7:
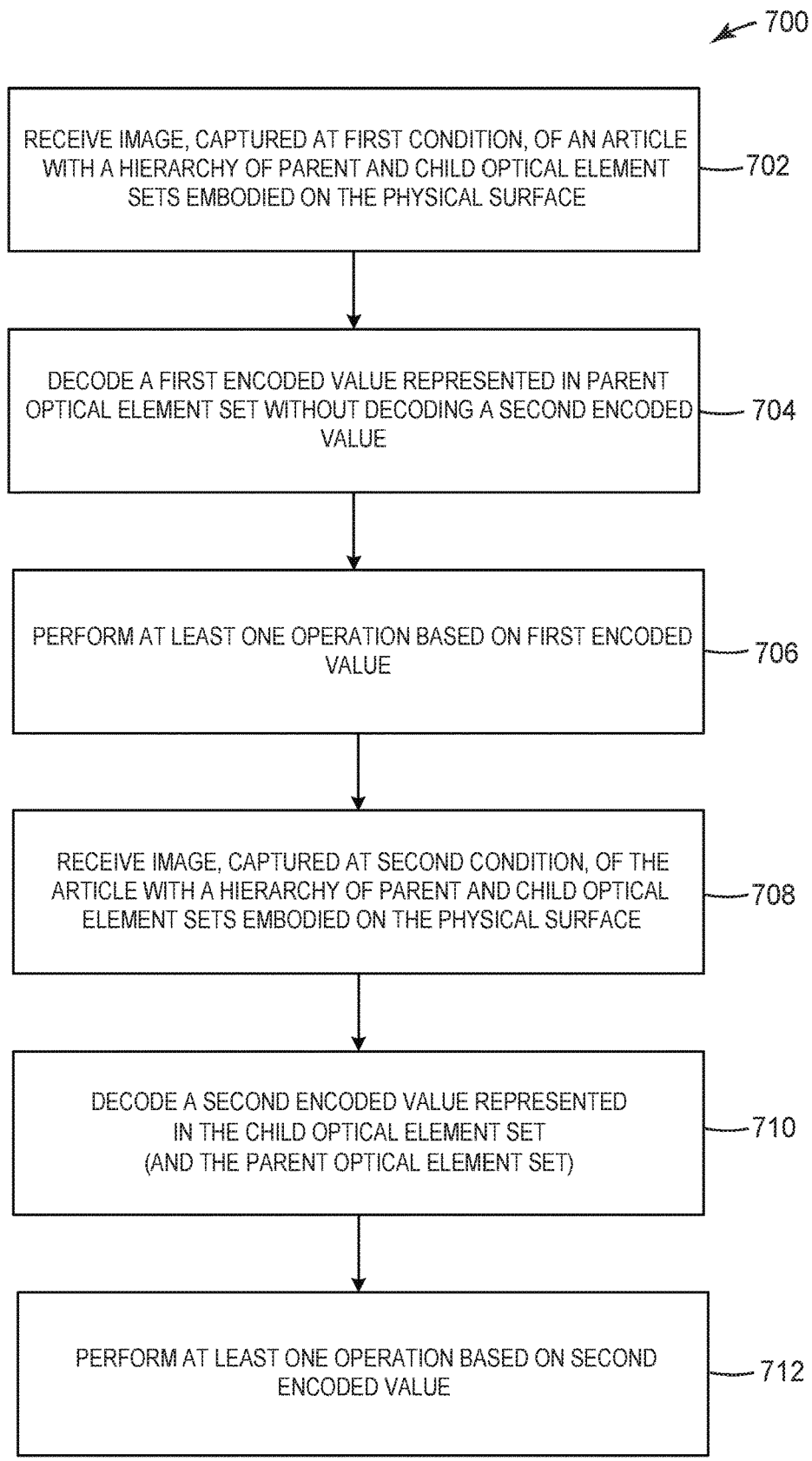
FIG. 7 illustrates a flow diagram including example operations performed by a computing device, in accordance with one or more techniques of this disclosure.

FIG. 7 illustrates a flow diagram 700 including example operations performed by a computing device, in accordance with one or more techniques of this disclosure. For purposes of illustration only, the example operations are described below as being performed by computing device 540 in FIGS. 5 and 6. Some techniques of FIG. 7 may be performed by one or more image capture devices, computing devices or other hardware.

In FIG. 7, computing device 540 receives an image of an article captured in a first condition, wherein a hierarchy of parent and child optical element sets are embodied on the physical surface of the article (702). The first condition can be a first distance greater than a threshold distance and/or using a light source with a first light intensity. In some cases, the parent optical element set including a first plurality of optical elements each of a first retroreflective property and the child optical element set including a second plurality of optical elements each of a second retroreflective property. In some cases, the parent optical element set including a first plurality of optical elements each of a first size and the child optical element set including a second plurality of optical elements each of a second size.

Computing device 540 may decode, using the image captured at the first condition, the first encoded value without decoding the second encoded value (704). Computing device 540 may perform at least one operation based at least in part on the first encoded value (706).

Computing device 540 may receive a second image of the article captured at a second condition (708). The second condition can be at a second distance that is less than the first distance and/or using a light source of a second intensity higher than the first light intensity. Computing device 540 may decode, using the image captured at the second condition a second encoded value (710). Computing device 540 may perform at least one operation based at least in part on the second encoded value (712).

In some examples, dynamic environments, such as work zones may provide more difficulty for autonomous or semi-autonomous vehicles. For instance, relying on enhanced maps and GPS may have limitations because hazards or workers may be dynamically relocated on minute-by-minute or hour-by-hour basis. Computing device 540, when implemented in a vehicle such as an autonomous, semi-autonomous or vision-assisted vehicle may provide real-time navigational markers with codes as described in this disclosure that allow such vehicles to reliably locate, people and devices and navigate through such areas, even if portions of the code are visually occluded by other objects or occlusions in the areas. In some examples, as described in this disclosure, codes are invisible to the human eye but are visible in specific wavelengths of light to commercially available machine sensors. These unique machine readable codes that may be attached to the work zone devices, may provide precise object detection and rapid processing to enable autonomous, semi-autonomous, or vision-assisted navigation. As such, a vehicle that include a computing device and image capture device such as described in this disclosure may alter its operation in response to determining information encoded in one or more codes.

In some examples, machine readable optical codes and systems for reading such codes in this disclosure are compatible with existing Manual on Uniform Traffic Control Devices (MUTCD) rules and/or with conventional work zone materials. In some examples, machine readable optical codes of this disclosure may provide information for faster and/or more accurate detection and processing by vehicles than other modalities (e.g., GPS, maps, etc.) for navigating vehicles. In some examples, universal machine readable optical codes may be standardized or constant for each particular type of article to which the code is embodied on. In some examples, distinct machine readable codes may be used for different types of articles in particular work zones or other bounded regions or areas. In some examples, a machine readable code may include a unique spatial configuration of optical elements and/or information encoded therein that represents a human or a worker. In some examples, localization data may be encoded in the machine readable code, where such localization information indicates locality specific information about the article or surrounding area of the article, and in some examples, may not be available in GPS or maps because of the dynamically changing environment in which the code is located. In some examples, the machine readable codes of this disclosure may be compatible with one or more sensors such as radar, Light Detection and Ranging (LIDAR). Near and Far Infrared, or any other suitable technologies. In some examples, one or more vehicles implementing techniques of this disclosure may exchange information decoded from the machine readable codes of this disclosure using V2X or other suitable wireless technologies. In some examples, the machine readable codes of this disclosure may be directly embodied on the article during article construction or may be later retrofitted with a decal or other layer that is later applied to an existing article.

The present disclosure may provide a variety of advantages over existing barcode technology. For example, the present disclosure may provide for different information to be read by a machine vision system at different conditions (e.g., distances, light source intensities) from the barcode. The present disclosure may provide for more information to be encoded in a 2D barcode through the use of content and context optical elements than may be encoded in a traditional barcode. The present disclosure may provide for a simpler and higher density of information encoding through the use of a retroreflective substrate. Some embodiments of the present disclosure may provide for a reduced number of finder optical elements, without a significant increase in false code finds, and while allowing for a greater data payload for the same code area. The present disclosure may also provide flexibility in code design so that intentional decisions can be made to prioritize various aspects of 2D code design, including complexity of finder optical elements, codeword size, physical area of the code, and amount of data to be encoded while intentionally weighing the cost of design choices, such as less data, less effective data recovery or increased false positive code identification. The present disclosure may provide for the creation of codes with varying shapes, including aspect ratio other than 1:1 (a rectangle) to maximize the size for the area of application.

Test Methods

Retroreflectivity Intensity

Retroreflective images were taken using either a visible or near-infrared light source. Visible retroreflective photographs of samples were taken with a CMOSIS-based USB 3.0 color camera (Model acA2000-165uc from Basler AG, Ahrensburg Germany). The retrolight source was a 100 watt halogen lamp (Lowel Pro Light from Tiffen Inc. Hauppauge, N.Y.), combined with a ground glass light diffuser (Lowel ID-50H from Tiffen Inc, Hauppauge, N.Y.) and a beam splitter (Nerlite® DOAL@-100-LED from Microscan, Renton, Wash.). The bead splitter was operated with the LED module removed. The camera was positioned on the center of the beam splitter and parallel to the center of the sample, with an entrance angle (defined as the angle between the retrolight source and the normal to the surface of the sample) of either 5 or 30 degree. The observation angle (defined as the angle between the retrolight/sample vector and the camera/sample vector) was approximately 0 degrees. Before the images were captured, the color intensity was calibrated using a white balance taken with a blank piece of print paper. The camera was set to an aperture setting of f/16 and images were taken at a viewing distance of 1.5 meters. The camera exposure time was adjusted to 1.3 and 1.8 milliseconds for 5 and 30 degree entrance angles, respectively.

Retroreflective images in the near-infrared wavelength range (at 850 and 940 nm) were taken with a USB 3.0 CCD camera (Model acA1300-30 um from Basler AG Ahrensburg Germany), using a 8.5 mm/f1.3 lens (Edmund Optics Barrington, N.J.) attached to either an 850 nm or a 940 nm band filter (BP850-30.5 and BN940-30.5 filter, respectively, from Mid Optic, Palatine, Ill.), with an aperture of f/8 at a distance of 1.5 meters. The retrolight source was an 83 millimeter diameter infrared LED ring light. The camera was positioned on the center of the ring light and parallel to the center of the sample, with an entrance angle of either 5 or 30 degree to the sample adhered to a vertical rotation stand. The observation angle is approximately 1.5 degrees. The camera exposure time for the 850 nm measurements was adjusted 10 milliseconds for all images. The camera exposure time for the 940 nm measurements was adjusted to 35 and 17 milliseconds for the 940 nm measurements for 5 and 30 degree entrance angles, respectively.

Retroreflective intensities were measured using pixel intensities from respective areas on the camera images. Commercially-available image processing software (ImageJ 1.48V freeware from the National Institutes of Health, Washington, D.C., obtainable through https://imagej.nih.gov/ij/) was used to calculate pixel intensities. An area of approximately 60×120 pixels was used for each region, and the minimum, maximum and mean pixel intensity were recorded.

Retroreflective intensities were measured using pixel intensities from respective areas on the camera images. Commercially-available image processing software (ImageJ 1.48V freeware from the National Institutes of Health, Washington, D.C., obtainable through https://imagej.nih.gov/ij/) was used to calculate pixel intensities. An area of approximately 60×120 pixels was used for each region, and the minimum, maximum and mean pixel intensity were recorded. The pixel intensity range from low to high is 0 to 255, respectively.

Coefficient of Retroreflectivity

Retroreflectivity was measured using the test criteria described in ASTM E810-03 (2013)—Standard Test Method for Coefficient of Retroreflective Sheeting ($R_A$) using the Coplanar Geometry at 0.20 observation angle and 50 entrance angle, i.e. 0.2/50 angle. Retroreflective units are reported in cd/lux/m2.

32-angle retroreflectivity measurement followed ANSI/ISEA 107-2010 standard.

The present disclosure includes in one instance a multi-dimensional machine-readable optical code. The optical code comprises a plurality of finder optical elements, a plurality of context optical elements and a plurality of content optical elements. The finder optical elements are arranged in a pattern and detectable by a machine vision system from a first distance. The context optical elements represent context information, and are detectable by a machine vision system from a first distance. The content optical elements represent content information, and are not detectable by a machine vision system from a first distance but are detectable by a machine vision system from a second distance, where the second distance is lesser than the first distance.

In some instances, the optical code includes a plurality of optical elements arranged in a matrix configuration comprising rows and columns.

In some instances, the finder optical elements enable a machine vision system to localize the optical code within an image.

In some instances, the optical code includes fewer than 36 finder optical elements.

In some instances, the finder optical elements are arranged in a centric crossed pattern.

In some instances, the context optical elements and the content optical elements are arranged in a manner to allow Reed-Solomon error correction.

In some instances, the optical code represents at least 756 bits of data.

In some instances, the content optical elements include instructional information.

In some instances, the context optical elements include installation, location or manufacturer information.

In some instances, the present disclosure includes a sign comprising a substrate, a film layer, and the two-dimensional machine-readable optical code described herein. In some instances, the sign comprises a retroreflective layer.

The present disclosure further comprises a system for reading a two-dimensional machine-readable optical code. The system includes a sign that includes a substrate and a two-dimensional machine-readable optical code. The optical code comprises a plurality of finder optical elements arranged in a pattern and detectable by a machine vision system from a first distance. The optical code also comprises a plurality of context optical elements representing context information, wherein the context optical elements are detectable by a machine vision system from a first distance. The optical code also comprises a plurality of content optical elements representing content information, wherein the content optical elements are not detectable by a machine vision system at a first distance but are detectable by a machine vision system from a second distance, and wherein the second distance is lesser than the first distance. The system further includes a machine vision system for detecting and processing the two-dimensional machine-readable optical code.

The present disclosure also includes a method of reading a two-dimensional machine-readable optical code. The method comprises detecting from a first distance, with a machine vision system, a plurality of finder optical elements arranged in a pattern. The method further comprises detecting from a first distance, with a machine vision system, a plurality of context optical elements representing context information. The method further comprises detecting from a second distance, with a machine vision system, a plurality of content optical elements representing content information, wherein the content optical elements are not detectable by a machine vision system at the first distance, and wherein the second distance is less than the first distance.

In some instances, the optical code includes a plurality of optical elements arranged in a matrix configuration comprising rows and columns.

In some instances, the finder optical elements enable a machine vision system to localize the optical code within an image.

In some instances, the optical code includes fewer than 36 finder optical elements.

In some instances, the finder optical elements are arranged in a centric crossed pattern.

In some instances, the context optical elements and the content optical elements are arranged in a manner to allow Reed-Solomon error correction.

In some instances, the optical code has a size of 7×7 and represents at least 63 bits of data.

In some instances, the content optical elements include instructional information.

In some instances, the context optical elements include installation, location, or manufacturer information.

Barcodes have been used in a variety of vehicle applications. When used in vehicle applications, barcodes can be on a license plate or a sign. Barcodes can be read using a machine vision system, which in some instances may be an automatic vehicle recognition (AVR) system. Exemplary uses of such systems are, for example, automatic tolling (e.g., electronic toll systems), traffic law enforcement (e.g., red light running systems, speed enforcement systems), detection of information on traffic signs or other elements of transportation infrastructure, searching for vehicles associated with crimes, access control systems, and facility access control. Ideal machine vision systems provide highly accurate (i.e., 100% accurate) results and are able to read barcodes from a distance at high accuracy.

Reading a bar code on a license plate, sign or any other uncontrolled environment poses a variety of challenges, including: (1) varying reflective properties of the license plate or sign materials; (2) varying resolution of the machine vision system; (3) the relative speed of the object the machine vision system is mounted to as compared to the object with the bar code; (4) wide variances in ambient illumination; (5) license plate or sign mounting location and/or tilt; (6) occlusion of the license plate or sign by, for example, other vehicles, dirt, snow, articles on the roadway, natural barriers. (7) vertical or horizontal curvature of a roadway, etc.

Barcodes on signs and license plates are known as discussed in a number of patents and applications. Some publications (e.g., European Patent Publication No. 0416742 and U.S. Pat. No. 6,832,728) discuss including one or more of owner information, serial numbers, vehicle type, vehicle weight, plate number, state, plate type, and county on a machine-readable portion of a license plate. PCT Patent Publication No. WO 2013-149142 describes a barcode wherein framing and variable information are obtained under two different conditions. In some embodiments, the framing information is provided by human-readable information, and variable information is provided by machine-readable information. European Patent Publication No. 0416742, U.S. Pat. No. 6,832,728, and PCT Patent Publication No. WO 2013-149142 are all incorporated in their entirety herein.

Some prior art methods of creating high contrast license plates and signs involve including materials that absorb in the infra-red wavelength range and transmit in the visible wavelength range. For example, U.S. Pat. No. 6,832,728 describes license plates including visible transmissive, infra-red opaque indicia. U.S. Pat. No. 7,387,393 describes license plates including infra-red blocking materials that create contrast on the license plate. U.S. Pat. No. 3,758,193 describes infra-red transmissive, visible absorptive materials for use on retroreflective sheeting. The entirety of U.S. Pat. Nos. 3,758,193 and 7,387,393 are incorporated herein by reference.

The entireties of U.S. Provisional Applications identified by application Nos. 62/485,426 and 62/485,471, each filed on Apr. 14, 2017, are incorporated herein by reference.

Another method of creating high contrast license plates for use in ALPR systems is described in U.S. Patent Publication No. 2010-0151213 and involves positioning an infra-red-reflecting material adjacent to an optically active (e.g., reflective or retroreflective) substrate such that the infrared-reflecting material forms a pattern that can be read by an infrared sensor when the optically active substrate is illuminated by an infrared radiation source. The entirety of U.S. Patent Publication No. 2010-0151213 is incorporated herein by reference.

It will be clear to a person skilled in the art that features described in relation to any of the embodiments described above can be applicable interchangeably between the different embodiments. The embodiments described above are examples to illustrate various features of the disclosure.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. This disclosure is not restricted to the details of any foregoing embodiments. This disclosure extends to any novel one, or any novel combination, of the features disclosed in this specification (including any accompanying claims, abstract and drawings), or to any novel one, or any novel combination, of the steps of any method or process so disclosed.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM. EEPROM. CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair. DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Exemplary Embodiments

Item A1. An article comprising: a substrate having a surface; a parent optical element set comprising one or more parent optical elements disposed on the surface of the substrate, a child optical element set comprising one or more child optical elements disposed on the surface of the substrate, a first encoded value associated with at least one of the parent optical elements, and a second encoded value associated with at least one of the child optical elements, wherein each of the parent optical elements has a first retroreflective property, wherein each of the child optical elements has a second retroreflective property different from the first retroreflective property.

Item A2. The article of Item A1, wherein the second encoded value is associated with at least one of the child optical elements and at least one of the parent optical elements.

Item A3. The article of Item A1 or A2, wherein the first encoded value is decodable at a first distance and the second encoded value is not decodable at the first distance.

Item A4. The article of Item A3, wherein the second encoded value is decodable at a second distance that is smaller than the first distance.

Item A5. The article of any one of Items A1-A4, wherein the first encoded value is decodable at a first light source intensity, and wherein the second encoded value is not decodable at the first light source intensity.

Item A6. The article of Item A5, wherein the second encoded value is decodable at a second light source intensity that is higher than the first light source intensity.

Item A7. The article of any one of Items A1-A6, wherein the first and second retroreflective properties are retroreflective intensity values different from each other.

Item A8. The article of any one of Items A1-A6, wherein the first and second retroreflective properties comprise wavelengths different from each other.

Item A9. The article of any one of Items A1-A6, wherein the first and second retroreflective properties comprise polarization states different from each other.

Item A10. The article of any one of Items A1-A9, wherein the first and second retroreflective properties comprise phase retardations different from each other.

Item A11. The article of Item A2, wherein the first encoded value and the second encoded value are associated with a same parent optical element.

Item A12. The article of any one of Items A1-A11, wherein the parent and child optical element sets are not included in a QR code.

Item A13. The article of any one of Items A1-A12, wherein the parent optical element set represents context information that is descriptive of the article, and wherein the child optical element set represents content information that is descriptive of the context information.

Item A14. The article of any one of Items A1-A13, wherein the parent optical element set is separated from the child optical element set.

Item A15. The article of any one of Items A1-A14, further comprises: a plurality of finder optical elements, wherein the finder optical elements enable a machine vision system to localize one or more of the parent optical element set or the child optical element set within an image.

Item A16. The article of any one of Items A1-A15, wherein the article comprises at least one of a traffic sign, a license plate, a garment, a wearable, a vehicle, an infrastructure, a sign, or a decal.

Item B1. A method comprising: receiving, by a computing device a first image and a second image an article having a substrate that includes a surface, wherein the first image is captured at a first condition, wherein the second image is captured at a second condition different from the first condition, wherein a parent optical element set comprising one or more parent optical elements is disposed on the surface of the substrate, wherein a child optical element set comprising one or more child optical elements is disposed on the surface of the substrate, wherein each of the parent optical elements has a first retroreflective property, wherein each of the child optical elements has a second retroreflective property different from the first retroreflective property; decoding by the computing device, a first encoded value using the first image; and decoding by the computing device, a second encoded value using the second image.

Item B2. The method of Item B1, identifying a first one of the parent optical elements using the first image, and wherein the first encoded value is associated with the first one of the parent optical elements.

Item B3. The method of Item B2, identifying at least one of the child optical elements using the second image, wherein no child optical elements are identifiable using the first image, and wherein the second encoded value is associated with the at least one of the child optical elements.

Item B4. The method of Item B3, identifying a second one of the parent optical elements using the second image, and wherein the second encoded value is associated with the at least one of the child optical elements and the second one of the parent optical elements.

Item B5. The method of Item B4, wherein the first one of the parent optical elements and the second one of the parent optical elements are a same parent optical element.

Item B6. The method of any one of Items B1-B5, wherein the first image is captured at a first distance.

Item B7. The method of Item B6, wherein the second image is captured at a second distance, wherein second encoded value is not decodable using the first image.

Item B8. The method of any one of Items B1-B7, wherein the first encoded value is decodable at a first light source intensity, and wherein the second encoded value is not decodable at the first light source intensity.

Item B9. The method of Item B8, wherein the second encoded value is decodable at a second light source intensity that is higher than the first light source intensity.

Item B10. The method of any one of Items B1-B9, wherein the first and second retroreflective properties comprise retroreflective intensity values different from each other.

Item B11. The method of any one of Items B1-B9, wherein the first and second retroreflective properties comprise wavelengths different from each other.

Item B12. The method of any one of Items B11-B9, wherein the first and second retroreflective properties comprise polarization states different from each other.

Item B13. The method of any one of Items B1-B9, wherein the first and second retroreflective properties comprise phase retardations different from each other.

Item B14. The method of any one of Items B1-B13, wherein the parent and child optical element sets are not included in a QR code.

Item B15. The method of any one of Items B1-B14, wherein the parent optical element set represents context information that is descriptive of the article, and wherein the child elements represent set represents content information that is descriptive of the context information.

Item B16. The method of any one of Items B1-B9, wherein the parent optical element set is separated from the child optical element set.

Item B17. The method of Item B16, wherein the article further comprises a plurality of finder optical elements disposed on the substrate, and wherein the finder optical elements enable the computer device to localize one or more of the parent optical element set or the child optical element set within an image.

Item B18. The method of any one of Items B1-B17, wherein the article comprises at least one of a traffic sign, a license plate, a garment, a wearable, a vehicle, an infrastructure, or a decal.

Item B19. The method of any one of Items B1-B18, further comprising: performing at least one operation based at least in part on the first encoded value.

Item B20. The method of Item B19, wherein performing the at least one operation comprises at least one of: generating for output an alert; generating for output a report; storing the message; or modifying the operation of a vehicle.

Item B21. The method of any one of Items B1-B20, wherein the computing device is included within a vehicle.

Item B22. A computing device comprising: one or more computer processors; and a memory comprising instructions that when executed by the one or more computer processors cause the one or more computer processors to perform any of the methods of Items B1-B21.

Item B23. A non-transitory computer-readable storage medium encoded with instructions that, when executed, cause at least one processor of a computing device to perform any of the method of Items B1-B21.

Item B24. An apparatus comprising means for performing any of the method of Items B1-B21.

Item C1. A method comprising: receiving, by a computing device an image an article having a substrate that includes a surface, wherein a parent optical element set comprising one or more parent optical elements is disposed on the surface of the substrate, wherein a child optical element set comprising one or more child optical elements is disposed on the surface of the substrate, wherein each of the parent optical elements has a first retroreflective property, wherein each of the child optical elements has a second retroreflective property different from the first retroreflective property; decoding by the computing device, a first encoded value using the image of the article with a first processing method; and decoding by the computing device, a second encoded value using the image of the article with a second processing method different from the first processing method.

Item C2. The method of Item C1, wherein the first processing method has a first threshold value and the second processing method has a second threshold value different from the first threshold value.

Item C3. The method of Item C1 or C2, wherein the first and second retroreflective properties comprise retroreflective intensity values different from each other.

Item C4. The method of any one of Items C1-C3, wherein the first and second retroreflective properties comprise wavelengths different from each other.

Item C5. The method of any one of Items C1-C4, wherein the first and second retroreflective properties comprise polarization states different from each other.

Item C6. The method of any one of Items C1-C5, wherein the first and second retroreflective properties comprise phase retardations different from each other.

Item C7. The method of any one of Items C1-C6, wherein the parent and child optical element sets are not included in a QR code.

Item C8. The method of any one of Items C1-C7, further comprising:
performing at least one operation based at least in part on the first encoded value.

Item C9. The method of any one of Items C1-C8, wherein the parent optical element set represents context information that is descriptive of the article, and wherein the child elements represent set represents content information that is descriptive of the context information.

Item C10. The method of any one of Items C1-C9, wherein the parent optical element set is separated from the child optical element set.

Item C11. The method of Item C10, wherein the article further comprises a plurality of finder optical elements disposed on the substrate, and wherein the finder optical elements enable the computer device to localize one or more of the parent optical element set or the child optical element set within an image.

Item C12. The method of any one of Items C1-C11, wherein the article comprises at least one of a traffic sign, a license plate, a garment, a wearable, a vehicle, an infrastructure, or a decal.

Item C13. The method of any one of Items C1-C12, further comprising: performing at least one operation based at least in part on the first encoded value.

Item C14. The method of Item C13, wherein performing the at least one operation comprises at least one of: generating for output an alert: generating for output a report; storing the message; or modifying the operation of a vehicle.

Item C15. The method of any one of Items C1-C14, wherein the computing device is included within a vehicle.

Item C16. A computing device comprising: one or more computer processors; and a memory comprising instructions that when executed by the one or more computer processors cause the one or more computer processors to perform any of the methods of Items C1-C15.

Item C17. A non-transitory computer-readable storage medium encoded with instructions that, when executed, cause at least one processor of a computing device to perform any of the method of Items C1-C15.

Item C18. An apparatus comprising means for performing any of the method of Items C1-C15.

Various examples have been described. These and other examples are within the scope of the following claims.

What is claimed is:

1. An article comprising:
a substrate having a surface;
a retroreflective parent optical element set comprising one or more parent optical elements having a first retroreflective property and being disposed on the surface of the substrate, wherein at least one of the parent optical elements is associated with a first encoded value; and
a retroreflective child optical element set comprising one or more child optical elements having a second retroreflective property and disposed on the surface of the substrate, wherein the second retroreflective property is different form the first retroreflective property of the one or more parent optical elements, and wherein at least one of the child optical elements is associated with a second encoded value.

2. The article of claim 1, wherein the second encoded value is associated with the at least one child optical element and at least one of the parent optical elements.

3. The article of claim 1, wherein the first retroreflective property enables decoding of the first encoded value associated with the at least one parent optical element at a first distance from the surface of the substrate, and wherein the second retroreflective property does not enable decoding of the second encoded value associated with the at least one child optical element at the first distance from the surface of the substrate.

4. The article of claim 3, wherein the second retroreflective property enables the decoding of the second encoded value associated with the at least one child optical element at a second distance from the surface of the substrate, the second distance being smaller than the first distance.

5. The article of claim 1, wherein the first retroreflective property enables decoding of the first encoded value associated with the at least one parent optical element at a first light source intensity, and wherein the second retroreflective property does not enable decoding of the second encoded value associated with the at least one child optical element at the first light source intensity.

6. The article of claim 5, wherein the second retroreflective property enables the decoding of the second encoded value associated with the at least one child optical element at a second light source intensity that is higher than the first light source intensity.

7. The article of claim 1, wherein the first and second retroreflective properties are retroreflective intensity values different from each other.

8. The article of claim 1 wherein the first and second retroreflective properties comprise polarization states different from each other.

9. The article of claim 1,
wherein the parent optical element set represents context information that is descriptive of the article, and
wherein the child optical element set represents content information that is descriptive of the context information.

10. A method comprising:
receiving, by a computing device a first image and a second image an article having a substrate that includes a surface,
wherein the first image is captured at a first condition, wherein the second image is captured at a second condition different from the first condition,
wherein a parent optical element set comprising one or more parent optical elements is disposed on the surface of the substrate, wherein a child optical element set comprising one or more child optical elements is disposed on the surface of the substrate, wherein each of the parent optical elements has a first retroreflective property, wherein each of the child optical elements has a second retroreflective property different from the first retroreflective property, decoding by the computing device, a first encoded value using the first image, and decoding by the computing device, a second encoded value using the second image.

11. The method of claim 10, wherein the first and second retroreflective properties comprise retroreflective intensity values different from each other.

12. The method of claim 10, further comprising:
performing at least one operation based at least in part on the first encoded value.

13. The method of claim 12, wherein performing the at least one operation comprises at least one of:
generating for output an alert;
generating for output a report;
storing the message; or
modifying the operation of a vehicle.

14. A method comprising:
receiving, by a computing device an image an article having a substrate that includes a surface, wherein a parent optical element set comprising one or more parent optical elements is disposed on the surface of the substrate, wherein a child optical element set comprising one or more child optical elements is disposed on the surface of the substrate, wherein each of the parent optical elements has a first retroreflective property, wherein each of the child optical elements has a second retroreflective property different from the first retroreflective property, decoding by the computing device, a first encoded value using the image of the article with a first processing method, and decoding by the computing device, a second encoded value using the image of the article with a second processing method different from the first processing method.

15. The method of claim 14, wherein the first processing method has a first threshold value and the second processing method has a second threshold value different from the first threshold value.

* * * * *

UNITED STATES PATENT AND TRADEMARK OFFICE
CERTIFICATE OF CORRECTION

PATENT NO. : 10,929,730 B2
APPLICATION NO. : 16/335370
DATED : February 23, 2021
INVENTOR(S) : Shannon et al.

Page 1 of 3

It is certified that error appears in the above-identified patent and that said Letters Patent is hereby corrected as shown below:

On the Title Page

Item [56], Column 2
Lines 1-2, Delete "Developement" and insert -- Development --, therefor.

In the Drawings

Sheet 3 of 7 (Reference Numeral 350) (FIG. 3)
Line 1, Delete "Overlaminant" and insert -- Overlaminate --, therefor.

In the Specification

Column 3
Line 53, Delete ""I"," and insert -- "1", --, therefor.

Column 4
Line 2, Delete "n-any" and insert -- n-ary --, therefor.

Column 6
Line 23, Delete "Clarke." and insert -- Clarke, --, therefor.
Line 23, Delete "WHP031." and insert -- WHP031, --, therefor.
Line 67, Delete "limit" and insert -- limit, --, therefor.
Line 67, Delete "information." and insert -- information, --, therefor.

Column 7
Line 62, Delete "stationary." and insert -- stationary, --, therefor.

Column 12
Line 15, Delete "B 12" and insert -- B12 --, therefor.
Line 48, Delete "condition" and insert -- condition, --, therefor.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,929,730 B2

Column 13
Line 53, Delete "instance." and insert -- instance, --, therefor.

Column 16
Line 17-21, Delete "For instance, a GPS location encoded in the machine-readable code may be compared to a determined GPS location by a vehicle at the time a sign is read. Other such comparisons are possible and within the scope and spirit of this disclosure." and insert the same on Column 16, Line 16 as a continuation of the same paragraph.

Column 17
Line 59, Delete "Bluetooth®." and insert -- Bluetooth®, --, therefor.

Column 18
Line 37-55, Delete "Content datastore 634 may include: a series of bits consisting of the payload from content optical elements and the information associated with those series of bits. In some examples, content datastore 634 may include messages in encoded or decoded form. Context datastore 636 may include a series of bits consisting of the payload from context optical elements and the information associated with those series of bits. In some examples, context datastore 634 may include messages in encoded or decoded form. Error Correction Data 632 may include a series bits forming codewords constructed by the error correction algorithm which aids in reconstruction and verification of payload data found in the content optical elements and context optical elements. Service data 638 may include any data to provide and/or resulting from providing a service of service component 546. For instance, service data may include information about optically active articles (e.g., vehicle registration information), user information, or any other information." and insert the same on Column 18, Line 36 as a continuation of the same paragraph.

Column 19
Line 44-48, Delete "Computing device 540 may decode, using the image captured at the first condition, the first encoded value without decoding the second encoded value (704). Computing device 540 may perform at least one operation based at least in part on the first encoded value (706)." and insert the same on Column 19, Line 43 as a continuation of the same paragraph.

Column 20
Line 39, Delete "(LIDAR)." and insert -- (LIDAR), --, therefor.

Column 21
Line 14 (Approx.), Delete "Inc." and insert -- Inc, --, therefor.
Line 17 (Approx.), Delete "DOAL@" and insert -- DOAL® --, therefor.
Line 36, Delete "AG" and insert -- AG, --, therefor.

Column 23
Line 60, Delete "barriers." and insert -- barriers, --, therefor.

Column 25
Line 23, Delete "ROM." and insert -- ROM, --, therefor.
Line 24, Delete "EEPROM." and insert -- EEPROM, --, therefor.

Line 34, Delete "pair." and insert -- pair, --, therefor.

Column 28
Line 8, Delete "B11-B9," and insert -- B1-B9, --, therefor.

Column 29
Line 51, Delete "alert:" and insert -- alert; --, therefor.